Oct. 6, 1970   M. R. KRUPSKY   3,531,954
COMBINATION CLOTHES WASHER AND DRYER
Filed Aug. 6, 1968   8 Sheets-Sheet 3
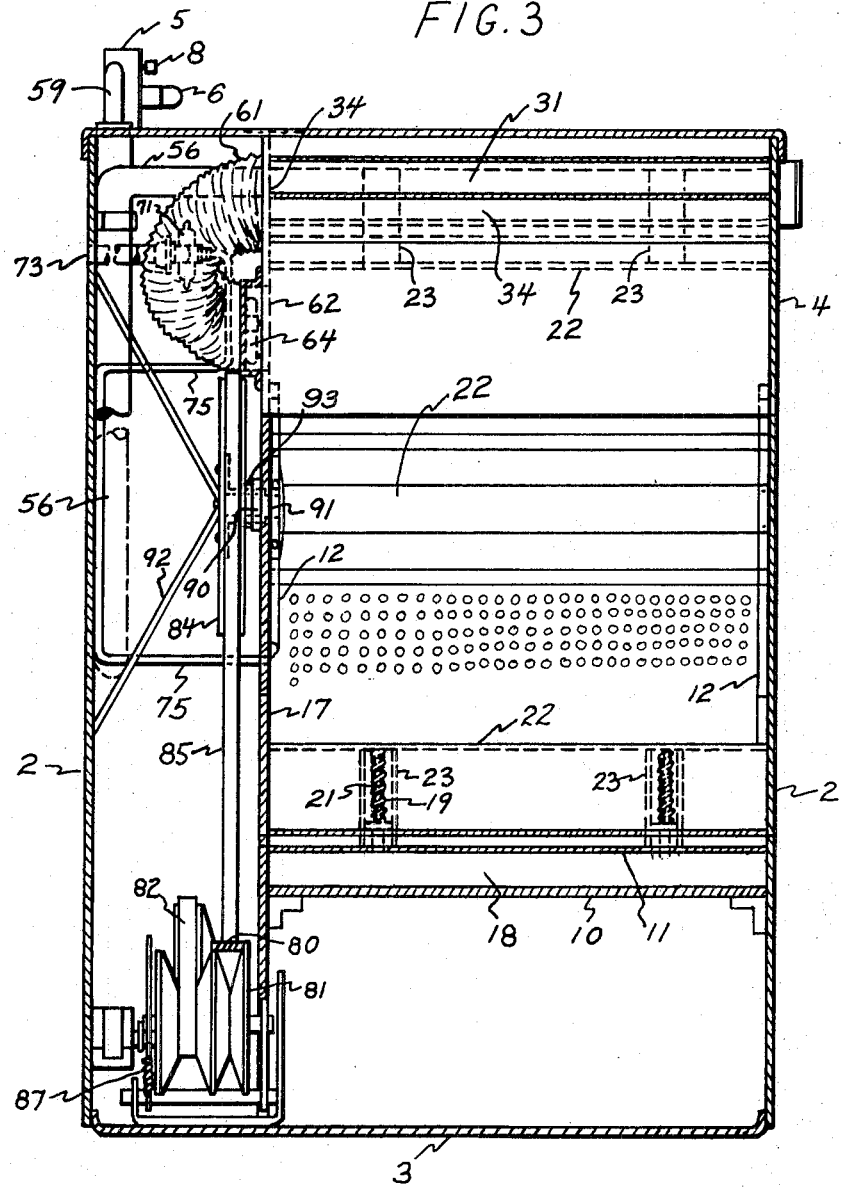
BY
MICHAEL R. KRUPSKY
INVENTOR.
Michael R. Krupsky

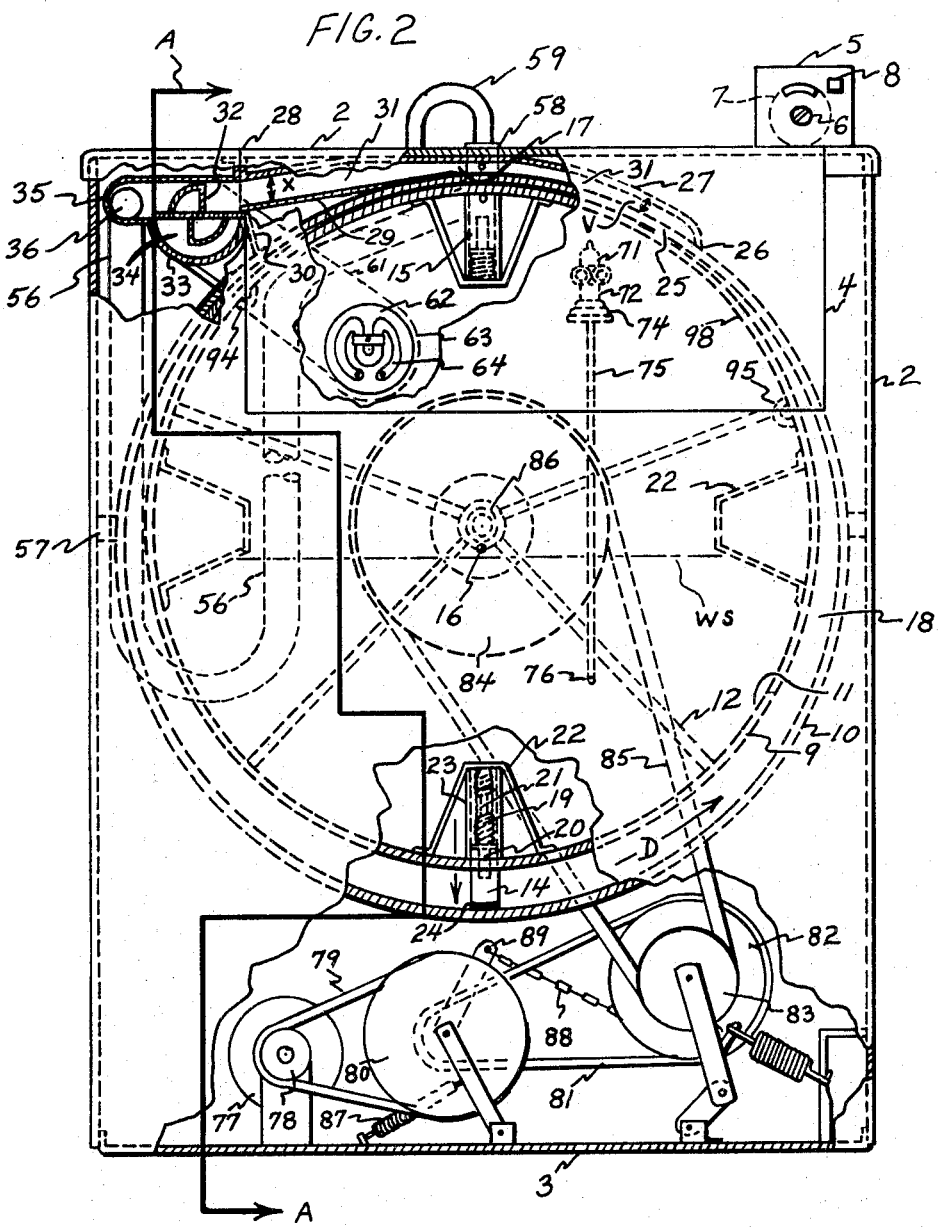

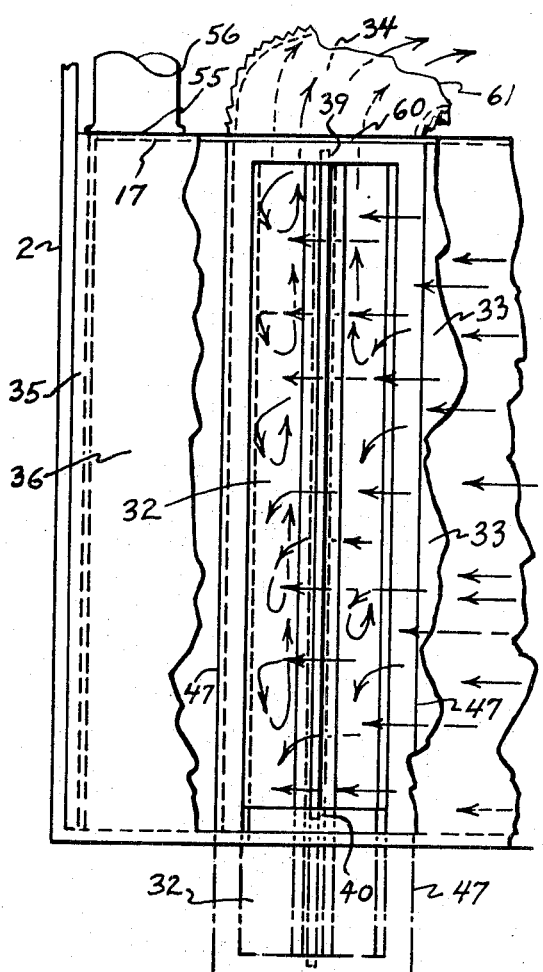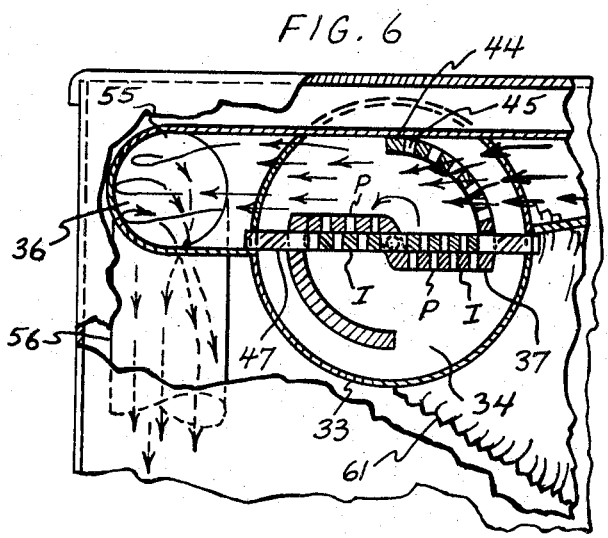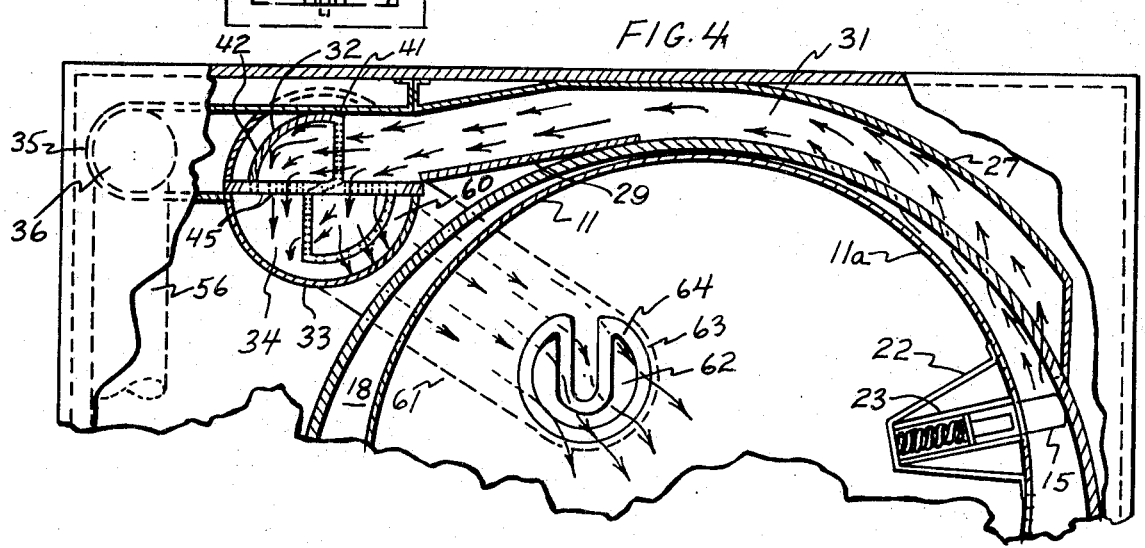

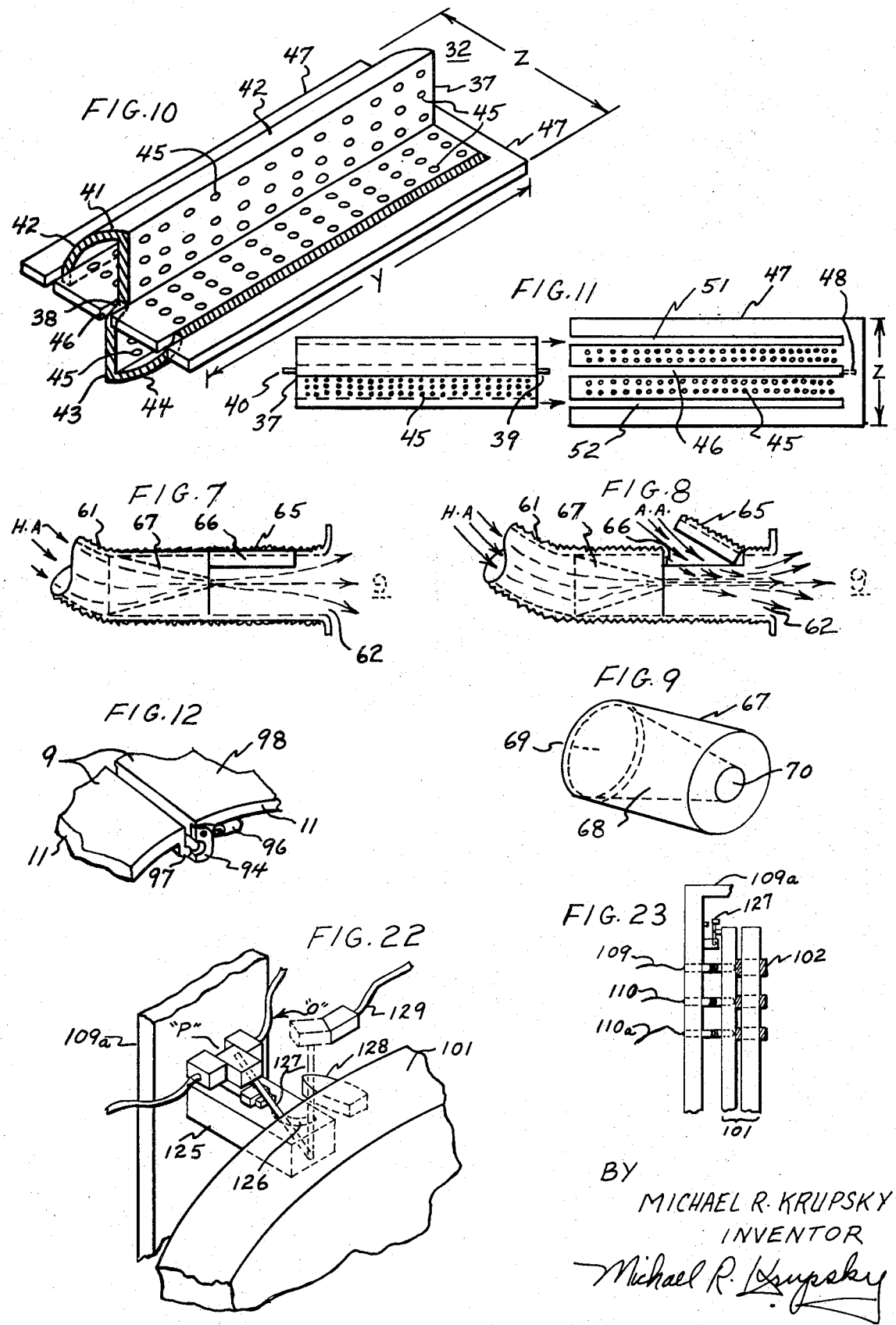

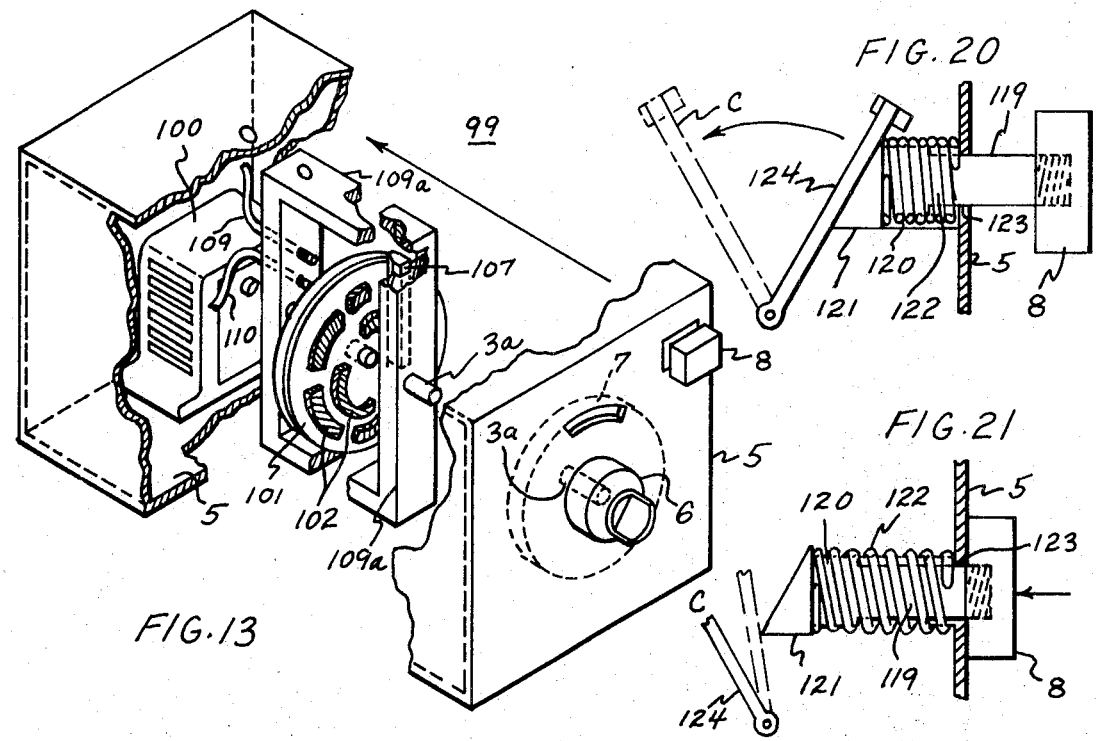
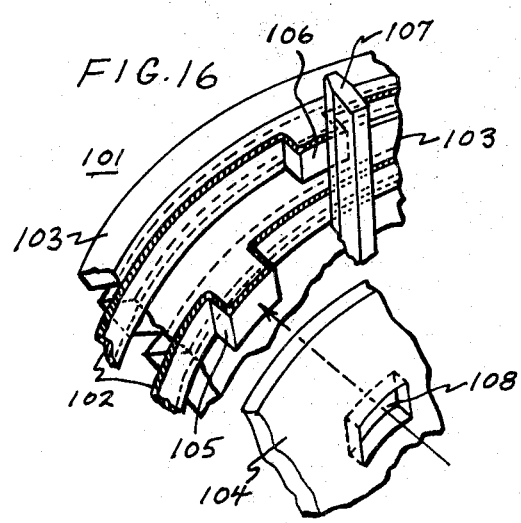
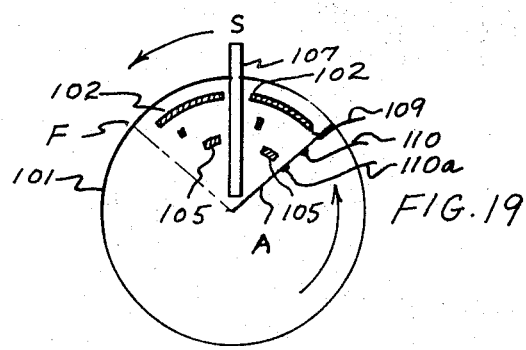
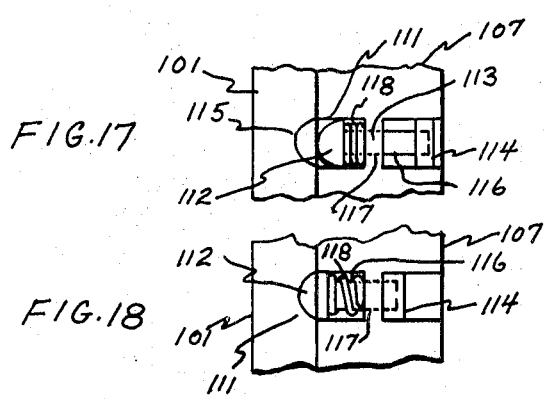

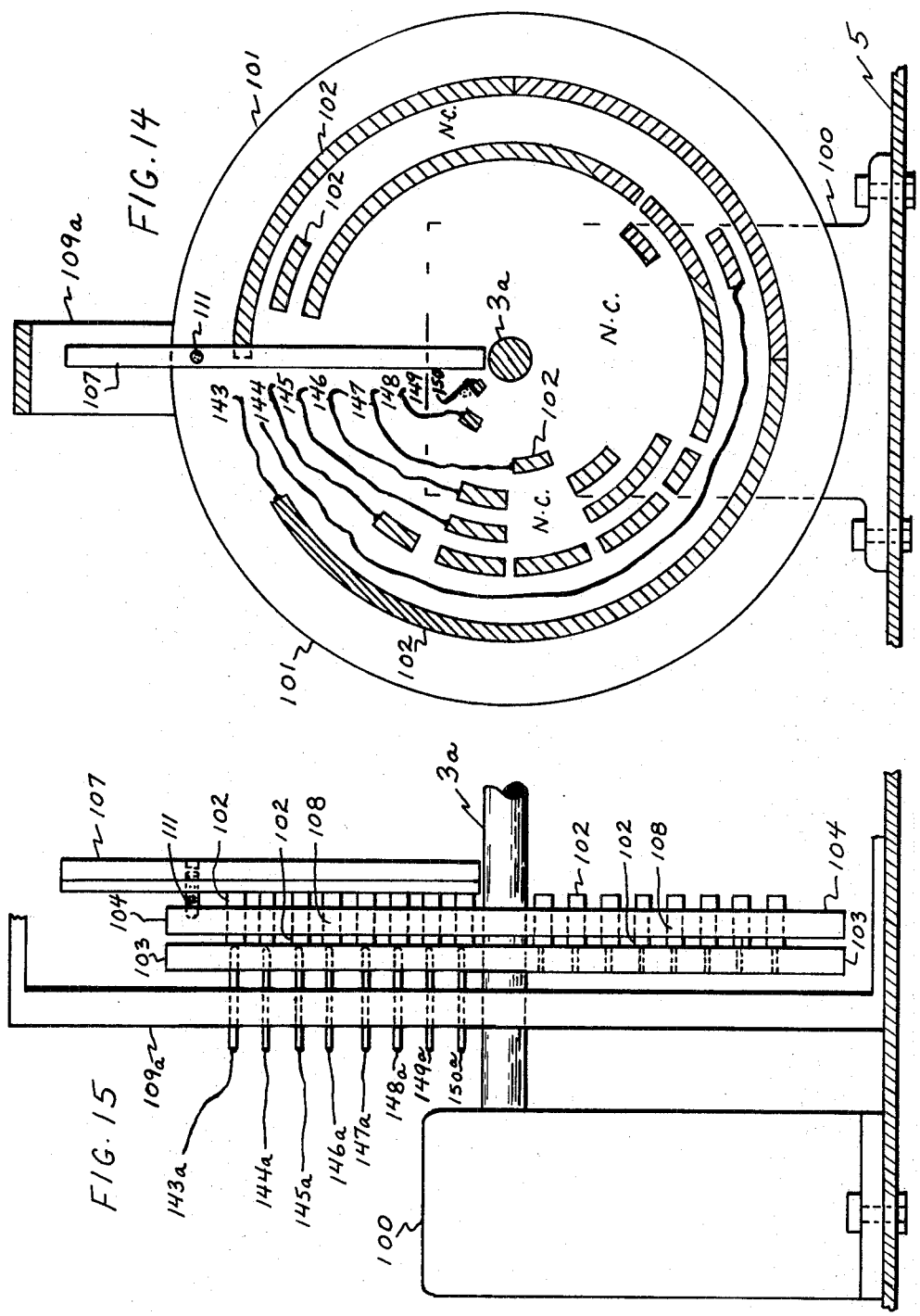

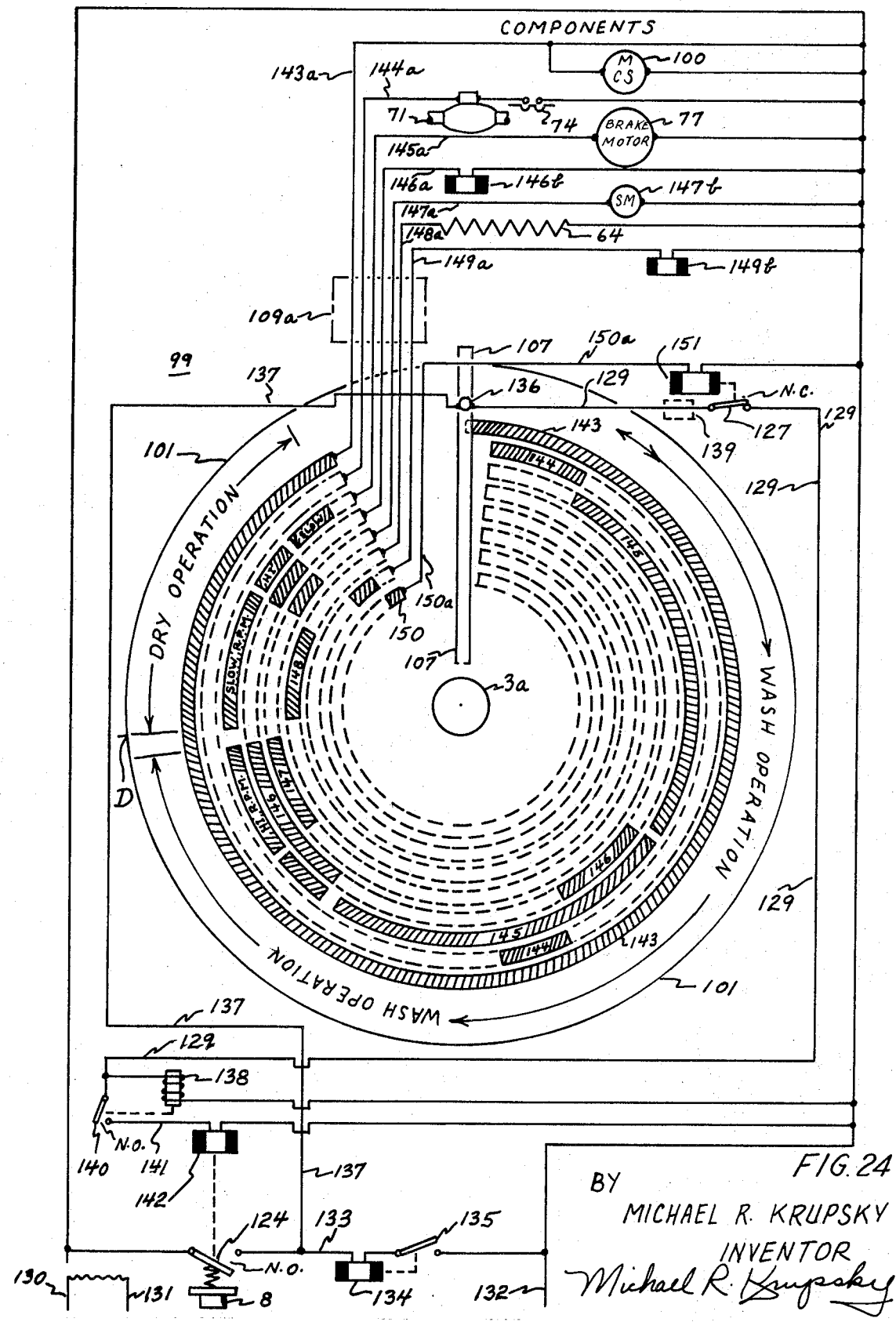

3,531,954
COMBINATION CLOTHES WASHER AND DRYER
Michael R. Krupsky, East Orange, N.J.
(20 Corsi Road, Bloomfield, N.J. 07003)
Filed Aug. 6, 1968, Ser. No. 750,498
Int. Cl. D06f *39/10, 25/00*
U.S. Cl. 68—18                                         17 Claims

ABSTRACT OF THE DISCLOSURE

A clothes washer and dryer having a rotatable container with apertures and baffles positioned and connected thereon to form, in cooperation with a stationary chamber surrounding the rotatable container, a separate enclosure to carry and transfer soiled solution and/or air from the rotatable container to the separate enclosure and then to an exterior first duct connected to the stationary chamber. An enclosure with a filter device and second duct leading from said exterior first duct to an aperture in a stationary wall of the rotatable container whereby filtered solution and/or air passes over a heater device in said second duct through the aperture for entrance in the rotatable container.

---

This invention relates to automatic clothes washers and dryers, and more particularly it encompasses an improved construction for more effective washing and drying of clothes as well as providing a washer and/or dryer construction which reduces the manufacturing cost of washers and dryers.

The construction provides for the simultaneous filtering of contaminants from washing solutions and drying air during the washing and drying operation for a more effective cleansing of clothes. This washer and dryer also provides for an almost complete elimination of residual sand and soil deposits left within the machine when a washing and drying operation is completed. A self-cleaning feature of the machine thus prevents said and soils left in the machine after an operation from being re-deposited on clothes in subsequent washing and drying operations.

Additional improvements this machine possesses over conventional washers and dryers are that no pump is required to discharge used solutions from the washer, and no centrifugal air blower is needed to introduce heated air into the dryer. In addition, no centrifugal blower is required to expel heated air out of the dryer when a drying cycle is completed.

The elimination of the conventional discharge pump in this invention completely overcomes the major problem of pump blockage and breakdown as frequently occurs in conventional washers. Secondly, the elimination of the pump initially saves the cost of installing a pump when the washer is manufactured and also reduces future repair costs to the consumer and/or the manufacturer.

The elimination of the conventional centrifugal air blower and the unique air discharge system prevents the accumulation of lint in the venting system that occurs in conventional dryers. This accumulation of lint in the venting system of conventional dryers reduces the efficiency of the dryer and creates the possibility of fire within and outside of the dryer. When no centrifugal blower is needed in a dryer the manufacturing and repair costs are reduced. Further, the removal and collection of lint from the clothes and the machine of this invention are substantially improved.

In conventional washers and dryers soil and lint filtering aren't substantially effective in that the soil and lint filter traps are not designed and positioned to collect and entrap soils and lint outside of the washing and drying drum in the most optimum manner. In many cases, the filtering devices are positioned within the washing and drying container where the clothes and solution or air are being agitated. This presents a problem in that any soils or lint collected by the filter within the container and/or solution usually is washed by the same solution or extracted by the same air inside the container from the filter itself and the soils and lint are re-deposited into the washing solution and drying air from which the soils and lint were originally to be removed. Therefore, a longer washing and drying operation is required and reduction of cleaning effectiveness occurs.

In those washers and dryers wherein the solution or air is pumped or blown outside of the container to a filter, and then pumped or blown back into the cleaning container, the problem of minimal solution or air discharge and re-introduction is present. This minimal solution and air discharge, with accompanying soil and lint discharge, occurs because the conventional pumps and blowers used in washers and dryers are only capable of pumping or blowing a small amount of solution or air at any one time. The solution, air, lint, and soil discharge and re-introduction method provided by this washer and dryer enables a larger quantity of solution and air discharge and re-introduction into the machine at less manufacturing cost and with more effectiveness than conventional washers and dryers.

The reduction of the operational time required and the more effective washing and drying of clothes in this invention is provided for by having the filtering device outside of the washing and drying container and having the amount of solution discharged, filtered, and re-introduced into the machine substantially increased over conventional pumps, filters, and blowers. Further, the soils and lint removed from the clothes in the container are directed to an outside filter device wherein the filter entraps the soils and lint in such a manner as to disallow the introduction of the soils and lint back into the washing container wherein the soils can then be redeposited on the clothes.

Another distinct advantage of this invention over existing washers nad dryers is that the unit is self-cleaning of lint and detergent residues within the operating mechanisms of the unit. This excludes the filter. That is, the soils, lint, and residual water deposited on the interior of the drums in washers and dryers after an operation is as provided with this invention, wiped or scraped clean by a baffle means included in the re-circulating system.

The clothes washer and dryer of this application distinguish themselves from other clothes washers and dryers by the objects now herein stated.

It is an object of this invention to provide a clothes washer and dryer that possesses a re-circulating and filtering system wherein the filtering and regeneration of contaminated washing and rinsing solutions and drying air occurs simultaneously with the washing, rinsing, and drying of clothes in order that redeposition of loosened and suspended soils and lint on the clothes being washed and dried is substantially reduced. As a consequence thereof, the washing and drying actions are improved and intensified, thus causing a briefer, and more effective and efficient washing and drying operation.

It is another object of this invention to provide a clothes washer that possesses a re-circulating and filtering system wherein the washing and rinsing cycles are appreciably shortened by the water being filtered and reintroduced continuously during the washing operation.

It is a further object of this invention to provide a clothes washer wherein the need for a solution discharge pump is eliminated, thereby reducing manufacturing and repair costs.

It is yet a further object of this invention to provide a clothes washer and dryer that possesses a baffle means and a solution re-circulating and discharge system whereby the washer/dryer is automatically capable of cleaning itself of residual soils, solutions, and lint in the machine after an operation.

It is another object of this invention to provide a clothes dryer that possesses a re-circulating and filtering system wherein lint removed from the clothes being dried is filtered from contaminated circulating air and the contaminated air is regenerated and reintroduced into the drying drum continuously during the drying operation.

It is still another object of this invention to provide a clothes dryer that possesses an intake, agitating, and circulation means to eliminate the need to have a conventional centrifugal air blower in the system in order to introduce and circulate heated air into the dryer.

It is yet a further object of this invention to provide a clothes dryer that possesses a re-circulating and air discharge system wherein there is no conventional air blower required to expel heated air after a drying operation.

It is another object of this invention to provide a clothes washer and dryer which possesses a filtering means and discharge system wherein the accumulation of soils and lint in the discharge vent system is eliminated.

It is yet another object of this invention to provide a combination clothes washer and dryer that eliminates two major component sources of breakdown (the conventional pump and centrifugal blower); thereby enabling a washer and a dryer to be combined as one unit without having the disadvantages of increased potential breakdown inherent in other conventional combination washers and dryers.

It is still a further object of this invention to provide a combination washer and dryer which reduces the time and the electrical energy required to wash and dry clothes as a result of increased efficiency in both the washer and dryer operations. A reduction in electricity required is also a result of the clothes and washer drum apparatus, having being previously heated during a washing operation, maintaining most of the previously generated heat to be used in the drying operation. Therefore, the electrical energy required to heat the drum apparatus and the clothes for a drying operation is obviated since the drying operation immediately follows the washing operation.

In carrying out my invention in one form thereof, there is provided a clothes washer and dryer that possesses a clothes container with a plurality of inwardly extending interior vanes. This affords the means for tumbling clothes, agitating wash and rinse water, and creating air movement. This washer and dryer is comprised, for purposes of better illustration, of a horizontally mounted, rotatable drum which is adapted to receive clothes for washing and drying while the rotatable drum is enclosed by a stationary drum. The rotatable drum possesses both imperforate and perforated wall sections. A second imperforate and stationary cylindrical chamber surrounds and encloses the rotatable drum and cooperates therewith over the entire circumference of the rotatable drum so as to define a re-circulating annular passage therebetween. The inner rotatable drum has an independent electric motor and pulley sheave assembly provided to rotate the inner drum in order that the clothes may be tumbled and the wash water and air can be agitated within the drum. The perforated wall sections of the inner drum are provided in order to allow passage of water and/or air into the circulating annular passage defined between the inner rotatable drum and the outer stationary drum. The imperforate or solid sections of the rotatable drum are provided to prevent water and/or air (once the water and air enter the circulating annular passage) from entering back into the interior of the rotatable drum.

The imperforate sections of the rotatable inner drum extend from one vertical wall of the stationary container to the opposite vertical wall of the stationary container. On the exterior side of the inner drum wall, adjacent to the imperforate sections of the drum, there are attached rigid spring-loaded baffles. The spring-loaded baffles direct, carry, and force washing solution and/or air through a filter that is positioned in the upper left quadrant of the annular re-circulating passage. The filter and annular passage arrangement provide the means for the continual entrapment and filteration of solids, suspended soils, and lint from the contaminated solution and/or air.

In order to enable the water and air to enter the filter and pass to a re-introduction passage provided therein from the annular re-circulating passage, there is provided an aperture in the cylindrical wall of the stationary container.

The circulating water and/or air is forced by the spring-loaded baffles, to the filter and re-introduction passage as the drum and the baffle are rotated.

A most important characteristic of the invention is that the inner rotatable drum and the outer stationary container do not have the same center. They have an eccentric relationship. That is, the cylindrical rotatable drum is rotatable from an axle at its center point, but the axle which drives the inner drum passes through the vertical wall of the outer container at a point which is above the true center point of the outer cylindrical container. This eccentric relationship between the inner drum and the outer container places the cylindrical wall of the inner drum against the interior side of the cylindrical wall of the stationary container at only one point of contact.

An outlet aperture in the cylindrical wall of the stationary container begins at the point of contact between the drum and the container and extends a short distance on the wall of the stationary container. This outlet aperture provides for the passage of water and/or air from the annular re-circulating passage, between the drum and the container, through the filter into the water or air re-introduction passage.

The water or air passing from the interior of the rotatable drum to the annular passage is forced by the rigid spring-loaded baffles through the outlet aperture in the wall of the stationary container through the filter and into the re-introduction passage. The re-introduction passage then provides means for the water or air to pass through an aperture in the back vertical wall adjacent to the stationary container back into the interior of the rotatable drum. Thus soiled water and/or contaminated air is taken from the rotatable drum and then the contaminated water and/or air is passed into the interior of the rotatable drum as clean water or air.

The spring-loaded baffles attached to the rotatable drum are free to move in a straight linear manner up or down in the annular passage. As the baffles travel from the wider to the narrower portions the annular passage, the spring, and slideable arrangement of the baffles provide for the baffles to shorten or lengthen in width. Therefore, the baffles can pass by the point of closest contact between the exterior wall of the rotatable drum and the interior wall of the stationary container.

In addition to the baffles and annular passage providing means to thrust water and air through the filter, the baffles provide for the propulsion of air through the re-introduction passage to pass over a heater disposed in the re-introduction passage. The air is heated by the heater and injected into the interior of the rotatable drum, thus eliminating the need for a conventional centrifugal air blower or impeller in this dryer.

The baffles and annular passage in combination with a rotatable filter device also provide means, in the manner just described, for the discharge of soiled water or air from the machine through a discharge passage and drain hose. The discharge passage and drain hose are placed in adjacent relationship with the filter and re-introduction passage and eliminate the need for a conventional discharge pump in this washer and dryer.

The subject matter which I regard as my invention is particularly cited and distinctly claimed in the concluding portion of this specification. This invention, both as to organization and method of operation, together with further objects and advantages thereof may best be understood by reference to the following description taken in conjunction with the accompanying drawings.

In the drawings.

FIG. 2 is a front view of the combination machine of FIG. 1, the view being partly broken away and partly sectionalized in order to illustrate details;

FIG. 3 is a side elevational view of the combination machine of FIG. 2, the view being partly broken away and partly sectionalized and the view being taken along section line A of FIG. 2;

FIG. 4 is a front elevational view of the top section of the combination machine and shows to advantage the construction and dynamics of the re-circulating, filtering, and re-introduction system; the view being partly broken away in order to illustrate details;

FIG. 5 is a top elevational view of FIG. 4, the view being partly broken away and partly sectionalized in order to illustrate details;

FIG. 6 is a front elevational view of the top section of the machine and shows to advantage the construction and dynamics of the filter and discharge system; the view being partly broken away in order to illustrate details:

FIG. 7 is a side elevational view of the water and air re-introduction duct of FIG. 3, showing an ambient air intake means in a closed conditions;

FIG. 8 is a side elevational view of the ambient air intake means shown in an open condition, of the re-introduction duct of FIG. 7.

FIG. 9 is a perspective view of the interior of a part of the ambient air intake means of the water and air re-introduction duct of FIGS. 7 and 8.

FIG. 10 is a perspective view of the filter device of FIGS. 2 and 3;

FIG. 11 is a top view of the two parts of the filter device of FIG. 10;

FIG. 12 is an enlarged perspective elevation of the drum joining mechanism of FIGS. 1 and 2;

FIG. 13 is a perspective veiw of the control assembly of the machine of FIGS. 1, 2, and 3, the view being partly broken away and partly sectionalized in order to illustrate details;

FIG. 14 is a front elevational view of FIG. 13 showing the sequence control card, conductor bands, and main conductor bus bar, the view being partly broken away and partly sectionalized in order to illustrate details;

FIG. 15 is a side elevational view of FIG. 14, the view being partly broken away and partly sectionalized in order to illustrate details;

FIG. 16 is an isometric section of the control card and bus bar of FIG. 13 showing the relationship and construction of the control card, the view being partly broken away and partly sectionalized in order to illustrate details;

FIG. 17 is an enlarged side elevational view of the dial stop mechanism showing the bus bar and the control card of FIGS. 14 and 15 in a disengaged condition, the view being partly sectionalized in order to illustrate details;

FIG. 18 is an enlarged side elevational view of the dial stop mechanism of FIG. 17, the dial stop shown in an an engaged position, the view being partly sectionalized in order to illustrate details;

FIG. 19 is a schematic diagram showing a representative form of a sequence control card and a bus bar of FIG. 13, thereby illustrating the relationship between the control card and the bus bar at the beginning of an opperation and at the end of an operation.

FIG. 20 is an enlarged side elevational view of the start button mechanism of FIG. 13 shown in an open and non-operating position, the view being partly broken away in order to illustrate details;

FIG. 21 is an enlarged side elevational view of the start button mechanism of FIG. 20 shown in a closed and operating position, the view being partly broken away in order to illustrate details;

FIG. 22 is an elevational perspective view of a trip mechanism showing the manner in which the control card trips a switch to de-energize the circuit of the machine, the view being partly broken away in order to illustrate details;

FIG. 23 is a side elevational view of the trip mechanism shown in FIG. 22;

FIG. 24 is a schematic electrical diagram illustrating the control system of the combination washer and dryer machine of this invention.

Figure 1:
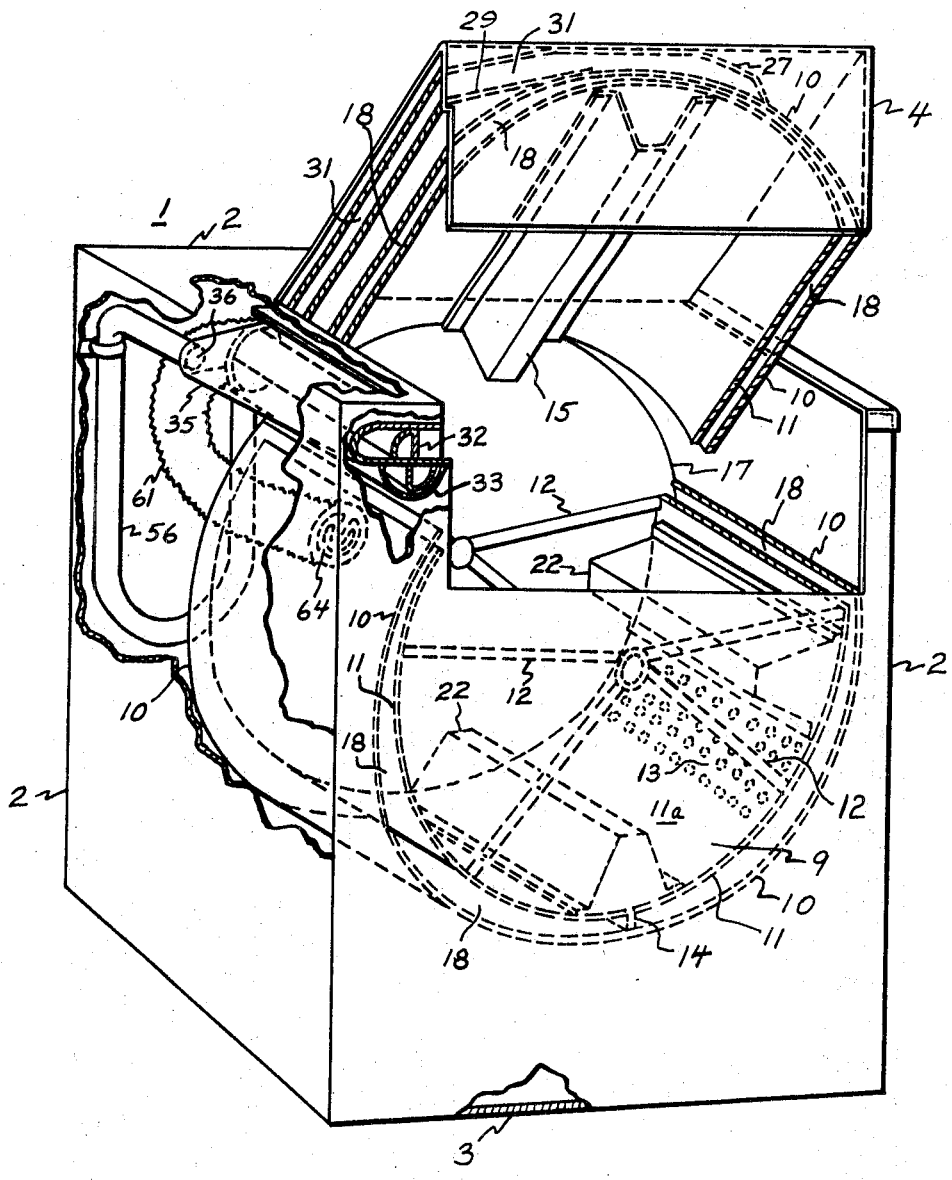
FIG. 1 is a perspective view of the combination washer and dryer machine of this invention, illustrating a representative form of the machine, as viewed from the front and partially from the left.

Referring now to FIGS. 1, 2, 3 and 13 I have shown the invention applied to a laundering machine 1 comprising a combination washer and dryer. The machine 1 includes a cabinet 2 which is mounted on a supporting structure 3. Access to the machine for loading and unloading of clothes is provided by a hinged door 4 disposed in the front and top wall of the cabinet 2. An enclosure 5 positioned at the top of the cabinet serves as a mounting and encasement means for suitable operator controls and the control assembly of the machine. These controls may, for example, comprise the rotatable knob 6 selector dial 7 and the pushbutton 8.

The machine 1 includes a cylindrical and roatable clothes tumbling drum 9, and a cylindrical stationary outer container 10 which completely encloses the tumbling drum. The drum 9 is mounted for rotation, provided for by means of a motor, pulley, and sheave assembly, and other related structures within container 10. The drum 9 is cylindrical in shape, having a circular wall 11 with no vertical back or front walls. In place of vertical front and back walls for the drum 9 there may be provided metal braces 12 which can provide additional strength to the drum and provide for the rotatable fixing of the drum to the shaft which drives the drum from the motor and pulley assembly. The circular wall portion 11 is perforate over certain sections 13 of its circular length, thereby producing an almost complete annulus of perforations around the drum. However, as seen in FIGS. 1 and 3 the annulus of perforations extending around the drum are located in predetermined areas of the drum wall 11. The perforations are generally disposed in the wall areas adjacent to the rear of the two spring-loaded baffles 14 and 15.

The solid or imperforate sections 11a are generally disposed in the wall areas adjacent to the front of the two spring-loaded baffles 14 and 15.

The drum 9 and the container 10 do not have a common center; that is, they are eccentric in their relationship to one another. The center point of the rotatable drum 9, from which the driving axle for the drum is attached to the drum, is situated above the center point 16 of the stationary container. The driving axle 86 of the rotatable drum 9 passes through the back vertical wall 17 of the stationary container 10. This off center positioning of the drum and container 10 produces an eccentric relationship between the drum and the container. Further, the eccentric relationship provides that the drum 9 always has one point, and one point *only* at any particular time of operation, on the circular wall 11 touch one point 17 on the interior side of the cylindrical wall of the stationary container 10.

In a direction clockwise from the point 17 to the front of the baffle 15, best seen in FIG. 4, constitutes the solid, or imperforate sections 11a of the drum 9. Subsequently, when the baffle 14 acquires the position of baffle 15 during rotation of the drum a similar imperforate section 11a extends from the point 17 to the front of the baffle 14.

As a result of the drum 9 being in eccentric relationship with conainer 10 the annular passage 18, defined by the wall 11 of drum 9 and the wall of the container 10, is at its widest cross-sectional dimension generally located at the bottom of the drum 9. The annular passage 18 gets narrower in cross-sectional dimension as the passage 18 approaches the point 17. At point 17 the wall of drum 9 makes contact with the wall of the container 10 in such manner as to allow a very tight, but a movable, contact between the drum 9 and the cylindrical wall of the container 10.

The spring-loaded baffles 14 and 15 are rigidly secured to the interior of the drum 9. However, as seen in FIG. 2, the baffle 14 is extended or pushed against the wall of the container 10 by the spring 19 thereby providing means for the baffle 14 to cover the space created by the annular passage 18. The baffles 14 and 15 also extend completely from the front vertical wall of the container 10, defined by the cabinet wall 2, to the vertical wall 17 of the container 10. This complete covering of the annular space between the drum 9 and the container 10 provides for the baffles 14 and 15 to push solution and/or air in the annular re-circulating passage 18 in a counter-clockwise direction to the uppermost point 17 of the stationary container.

The baffle 15, as seen in FIG. 2, is shown in a compressed condition and is pushed against the vane wall 15 in the interior of the drum to provide for the baffle 15 or baffle 14 to move past the point 17 when the drum is rotated. Thus, as the baffles 14 and 15 are caused to advance in the annular passage they are continually compressed and extended to always provide a covering of the space between the wall of the drum and stationary container at any point the baffles travel in the 360° rotatoinal path they are caused to move in.

The baffles 14 and 15 are simple in construction. The baffles are made of rigid metal provided with slots 20 located in the center of the baffles. The slots 20 are provided to enable the baffles to slide on rods 21. The rods 21 are rigidly attached to, and in the interior, of the clothes tumbling vanes 22 located inside of the drum 9. Springs 19 are placed around the rods 21 between the rigid material of the vanes 22 and the end portions of the baffles 14 and 15. The end portions of the baffles that extend into the interior of the vanes 22, and the rods 21, and springs 19 are all enclosed in metal tubular members 23. Tubular members 23 are rigidly secured in the interior portion of the vanes 22. The tubular members 23 provide a means for the baffles 14 and 15 and their corresponding springs 19 and rods 21 to be held firmly in place while the baffles 14 and 15 are caused to slideably compress and extend during the rotation of the drum 9. It should be noted that the baffles 14 and 15 may possess rubber, or some suitable flexible material, edge portions 24 in order to insure a tight water seal between the baffles and the wall of the stationary container 10.

In the cylindrical wall portion at the top of the container 10 there is provided an aperture 25 which provides for the passage of water and/or air from the annular passage 18 to a filter and a water and air re-introduction or a discharge passage of the machine. The aperture 25 generally starts at the point 26 on the wall of container 10 and ends at the predetermined distance on the wall shown at the point 17. The cylindrical length of the aperture 25, from point 26 to point 17, generally coincides with the dimensional length of the imperforate section 11a of the drum 9 when either of the baffles 14 or 15 are positioned at the water or air expulsion state as seen in FIG. 4. Both the imperforate section 11a of the drum and the aperture 25 of the container extend from the vertical front wall of cabinet 2 of the machine 1 to the vertical rear wall 17 of the container. That is, the baffles 14 and 15 and the aperture 25 have a dimensional width equal to the width of the container 10 as best seen in FIGS. 3 and 5.

Fixed at point 26 to the exterior side of the cylindral wall of container 10 is a duct 27 made of sheet metal that is formed in a manner corresponding with the curve of the container 10. At a point 28 on the cabinet wall 2 the sheet metal of duct 27 is attached to the cabinet wall 2. Duct 27 has a dimensional width equal to the width between the front cabinet wall 2 of the machine 1 to the rear vertical wall 17 of the container 10, as seen in FIGS. 3 and 5.

A bottom piece of sheet metal 29 of duct 27 is positioned and fixed parallel, and at a distance X, generally of one to several inches, from the top piece of sheet metal of the duct 27. The sheet metal member 29 of the duct is fixed at point 17 and at a point corresponding to point 28 on a support brace 30 attached to the conainer 10.

Metal member 29 also encompasses the width between the front wall of the machine and the rear wall 17 of the container as also seen in FIGS. 3 and 5. Duct 27 constitutes a water and/or air expulsion passage 31 on the exterior of the container 10. The passage 31 cooperating with the aperture 25 provides means to have water or air propelled by the baffles 14 and 15 to be directed to a water and air filter device 32 in the re-introduction duct 33.

The duct 33 is rigidly attached at point 28 to duct 27 and cabinet wall 2. Duct 33 consists of one piece of sheet metal shaped as a straight top portion extending a suitable distance of six to twelve inches from point 28 to where the metal is curved to form a semi-circular portion 35. After the metal duct 33 has been formed as a semi-circle 35, it is then shaped to form a second and larger semi-circle which constitutes the bottom of he duct 33. This one piece ductwork 33 is then fixed to the end section of metal piece 29 of duct 27 at support brace 30. The duct 33, as seen in FIGS. 3 and 5, also has a dimensional width equal to the distance between the front wall of cabinet 2 and the rear wall 17 of the container 10. The duct 33 cooperating with the duct 27 constitutes a water and air re-introduction passage 34.

The portion of the duct 33 nearest to the side cabinet wall 2 which is formed as the small semi-circle section 35 constitutes the water or air discharge passage 36. In the manner just described, the duct 33 uniquely acts as a water and air re-introduction passage 34 and also as a water and air discharge passge 36. This dual function of the duct 33 is accomplished by cooperating with the action of the filter device 32 as now herein explained.

Referring now to FIGS. 4, 5, 6, and 10 there is shown the filter device 32 in a perspective view (FIG. 10) and the filter device in its functional relationship with the ducts 27 and 33 in FIGS. 4, 5, and 6. The filter device 32 is constituted as two pieces of sheet metal or suitable plastic material with a dimensional length Y generally equal to the width between the front cabinet wall 2 and the rear wall 17 of the container 10. The filter device 32 is formed generally as a flat center section 37 with a small annular bend 38 in the middle of the center section 37. At this angular bend 38 in the section 37 two round rods 39 and 40, shown in FIG. 11, are rigidly fixed at each end of the section 37. From the top end of the central straight section 37 of the filter device, as seen at point 41, the metal or plastic sheet material is formed as an arcuate quarter section 42 of a circle. From the point 43 of the filter device the metallic or plastic material of the filter is formed as a second arcuate quarter section 44 of a circle.

The upper and lower straight halves of the center section 37 are provided with perforations 45 to allow water and/or air to pass through the material of the filter. The arcuate section 44 is also provided with perforations 45, best seen in FIG. 6, to allow the passage of water and air through the material of the filter. However, the arcuate section 42 of the filter device is an imperforate or solid piece of material which will not provide means for water and/or air to pass through the section 42 of the filter device 32.

The middle of center section 37 of the device 32 is fitted into a slot 46 of a second filtering section 47. Second filtering section 47 is made of a flat piece of suitable metal or plastice material and has a dimensional width Z which is slightly greater than the diameter of the larger semi-circular portion of the duct 33 which provides for the filter section 47 to rest on the end portions of the larger semi-circular portion of the duct 33. The length of the filter section 47 is also equal to the distance between the front wall of cabinet 2 and the rear wall 17 of the container 10.

Referring now particularly to FIG. 11, the round rod 39 of the filter section 37 is inserted into a hole 48 in the filter section 47 and the rod 40 fits into a hole 49 of a solenoid brace 50 (seen in FIG. 3). The rods 39 and 40 and the holes 48 and 49 provide means for firmly holding the section 37 for rotatable movement of the filter device 32.

The filter section 47 has two slots 51 and 52 into which the arcuate sections 42 and 44 of the device 32 moveably fits. The filter section 47 also possesses perforations 45 through which water and/or air can pass.

The complete filter device 32 consisting of perforated filter areas 37 and 44, and perforated filter section 47, rests as a unit on tthe larger semi-circular portion of the duct 33 and the complete filter device 32 is removable for cleaning from within the duct 33 by way of a hinged door 53 located on a solenoid enclosure 54 (seen in FIG. 3) fixed on the exterior of the front cabinet wall 2.

Referring now particularly to FIGS. 4 and 5 there is provided an aperture 60 located in the rear wall 17 of the container 10. The aperture 60 connects with duct passage 34 of the duct 33. Attached at the aperture 60 is a flexible hose 61 made of a suitable water and heat proof material. Referring momentarily to FIGS. 1 and 3, the hose 61 is an extension of the water and air re-introduction duct passage 34 and leads from the aperture 60 in the wall area adjacent to the filter device 32 through a suitable space between the rear wall 17 and the rear cabinet wall 2 to an aperture 62 located in an enclosure 63.

The enclosure 63 is attached to the rear wall 17 of the container 10. The hose 61 is positioned to cover the aperture 62 of the enclosure 63. The aperture 62 of the enclosure 63 extends through the wall 17 of the container 10 and provides for the passage of water and/or air from the re-introduction duct 33 to the interior of the drum 9. Located inside the enclosure 63 is an electric heater 64, which provides heat when energized, through the aperture 62 to dry clothes during a drying operation in the drum 9.

Referring now particularly to FIGS. 5 and 6, the semi-circular portion 35 of the duct 33 has an aperture 55 in the container wall 17 which cooperates with the passage 36 to provide an outlet from the machine 1 for the discharge of wash and rinse water after a washing operation and the expulsion of heated air after a drying operation. Fixed at the aperture 55 there is a flexible drain-hose 56 which provides for the discharged water and/or air to be directed to a household sink or suitable water disposal sump. The flexible drain hose 56 is of sufficient length of two to five feet to reach a nearby sink. The drain hose is located in the interior of the machine 1 when it is not in use at the rear of the container 10 and is held in place by suitable brackets 57. The end of the drain hose extends to the top and rear of the machine 1 through a suitable aperture 58 in the top wall 2 of the machine. The hooked end 59 of the drain hose 56 provides means for the operator to pull the length of hose hanging inside the machine to attach on an exterior household sink.

Referring now particularly to FIGS. 7 and 8 there is shown the end of the hose 61 attached adjacent to the aperture 62. Located at the top of the hose 61 is a vent flap 65. The vent flap 65 is hinged on the hose 61 and when the vent flap 65 is in a closed position, as seen in FIG. 7, it seals off an aperture 66 in the duct hose 61, in order that water or air cannnot leak out of the duct hose 61. When the vent flap is in an open position, as seen in FIG. 8, the aperture 66 is exposed. The exposure of the aperture 66 provides for ambient air to enter and be impelled into the interior of the drum 9 during a drying operation.

Referring now particularly to FIG. 9, there is shown an air flow constriction element 67. The constriction element 67 is formed as a cylinder of an outside diameter equal to the inside diameter of the hose 61. The element 67 possesses a conical cavity 68 and apertures 69 and 70. The element 67 is positioned inside the hose 61 as seen in FIGS. 7 and 8. When ambient air, A.A., is to be introduced into the interior of the drum 9, the vent flap 65 is open and air is drawn into the hose 61 and the ambient air is then carried by the moving heated air, H.A., in the hose 61 to the drum. The air in the hose 61 has a velocity flow which is increased by the smaller aperture 70 of the constriction element 67, and, therefore, the air flow passing through the aperture 70 has substantial velocity, and the pressure of the heated air inside the hose is decreased. Thus, ambient air is drawn into the heated air flow stream to be introduced into the drum.

Referring now particularly to FIGS. 2 and 3, there is a valve, not shown, controlled by a solenoid 71 which admits hot water to the machine 1, and a valve controlled by an opposed solenoid 71, which admits cold water to the machine. The hot and cold water valves under the control of solenoids 71 and 72 enable water to enter the machine through a common inlet 73.

A pressure activated sensing device 74 or water level control may be provided to control both solenoids 71 and 72 so as to provide the proper water solution level, W.S., in the machine during a washing operation. Sensing device 74 may be connected to the interior of the drum 9 by a suitable conduit 75 which connects with the bottom of the drum at 76, as shown.

During the operation of the machine 1 the drum 9 is driven by an electric brake motor 77. The drive from the motor to the drum includes a pulley 78 secured to the motor shaft so as to rotate therewith and over which passes a belt 79. Belt 79 drives an adjustable sheave assembly 80 of the type which is well known for use in achieving variable output speeds from a constant input sped source. The adjustable sheave assembly in turn operates a belt 81 to cause rotation of a pair of pulleys 82 and 83 secured to each other so as to be rotatable together. The rotation of pulley 83 is passed on to a large driving pulley 84 by a belt 85, pulley 84 being rigidly secured on the end of the drum shaft 86.

In this manner, motor 77 may be driven at a constant speed and, through the adjustable sheave assembly 80, the speed imparted to pulley 84 of drum 9 may be varied so as to provide an appropriate range of speeds for the drum. For instance, for tumbling purposes during the washing and rinsing operations, and also during the heat drying operation, a speed of approximately 40 r.p.m. may be provided to the drum, while a centrifuging speed of several hundred r.p.m. may be provided to the drum for effecting centrifugal extraction of liquid from the clothes prior to the heat drying operation.

When the sheave assembly 80 is in the position shown, it provides tumbling speed. However, when it is pulled over to the right as viewed in FIG. 2, it provides the higher speed. The assembly is biased to provide the lower of the two speeds by means of a spring 87. The action of this spring may be overcome by means of a small synchronous motor (not shown) which, through a chain 88 and rigid member 89 pulls the sheave assembly 80 over to the right against the action of the spring. Thus, when motor 77 is not energized, a low speed rotation is provided to the drum 9 and when the synchronous motor assembly is energized the high speed rotation is provided. The operation of the variable speed drive briefly described above does not form any part of the present invention, and is set forth merely to provide a substantially complete description of an operative machine. A complete detailed description of such a drive is provided, for instance, in Pat. 2,950,613, issued on Aug. 30, 1960 to John Bochan, and assigned to the General Electric Company.

Drum 9 is supported by the wall 17 of the outer container to which shaft holder and bearing housing 90 and 91 are rigidly held. In addition to the support given to the drum by the wall 17 of the outer container 10, additional strut members 92 may be attached to the rear wall of the container and the shaft bearing and holders. In addition, a bearing shaft spacer 93 may be provided to prevent pulley 84 from making contact with bearing housing 90 and 91 which are fixed elements.

Briefly, described now is the operation in conventional washing machine. In a conventional manner the washing and rinsing of the clothes is effected by similar structures referred to in this invention. The driving drum 9 is rotated by an electric motor 77 and its respective pulley and sheave assembly. A plurality of interior vanes 14a agitate the washing solution and tumble the clothes. The water that mixes with the detergent, previously placed in the drum, penetrates the fibres of the fabric and dissolves the soils in and on the fabric and holds the soils in suspension in the detergent solution. After a period of time the contaminated soil-laden water is discharged by a drain pump from the washer and one or more applications of new and clean rinse water is introduced so as to further loosen the residual soils and detergents from the clothes. After a tumbling process, as just described during the washing cycle, the partially contaminated rinse water is then discharged.

One of the primary disadvantages encountered with this type of conventional washing and drying operation is that the soils and lint which have been broken away from the clothes and dissolved by means of the soaps and detergents, redeposit themselves back unto the clothes that are being washed. Heretofore, no conventional washing method has achieved a substantially effective mechanical water or air circulation and filter means to prevent the redepositing of the soils back unto and into the fibres and fabric of the clothes once the soaps or detergents have loosened them from the clothes. The agitation of the washing solution in conventional systems loosens the soils from the clothes; but by the application of the same principles required to loosen the soils from the clothes, the washing solution also redeposits them back unto the clothes. Therefore, one or several rinses of clear water are generally required to ultimately remove the soils. The only acceptable method, thus far, for the washing of clothes is dependent upon chemical means, namely soaps and detergents. Hence, in conventional methods more costly and chemically complex soaps and detergents are required, longer washing cycles are needed, and separate and additional fills of clean rinse water in the drums are necessitated.

The unique construction of this invention utilizes for the first time a very effective water and air circulation and filter means for the prevention of the redepositing of soils and lint back unto the clothes. Thus, the overall washing and drying operational time for clothes is shortened, the need for complex and expensive soaps and detergents is substantially eliminated, and the need for more than one supplemental introduction of rinse water is substantially reduced. As a consequence thereof, a better and more efficient washing and drying of clothes is achieved by my invention.

Referring now again particularly to FIGS. 2, 4, 5, and 6, there are shown the detailed constructions which provide for the unique filtering and circulation system of this machine.

Once the clothes are placed in the machine through the door 4, the washing operation commences with the introduction of hot water throguh the solenoid 71, conduit 75, and water inlet 76. When the drum 9 is filled to the level, W.S., the pressure sensitive device 74 causes the water intake to be discontinued. The water in the drum will not only fill the drum 9 to an appropriate level but the water will also flow into the annular passage 18 through the perforations in the drum sections 13, as shown in FIG. 1.

The motor 77 is energized by depressing start button 8 and through the adjustable sheave assembly 80, the speed imparted to pulley 84 of the drum 9 causes the drum to rotate counter-clockwise at an approximate speed of forty (40) r.p.m. A plurality of vanes 22 provide the means to tumble the clothes inside the drum 9 for a washing operation.

As the drum rotates, the baffle 14 will push water or air located in the annular passage 18 in the direction of arrow D to the aperture 25. The water in the passage 18 will not flow back into the drum 9 because of the confining function of the imperforate areas 11a of the drum. As the drum rotates the baffles 14 and 15 continue to compress their respective springs 19, thus providing for the slideable movement of the baffles inside the retainers 23. This slideable movement of the baffles enables the baffles to continuously move in the passage 18 even though the passage 18 narrows in special annular dimension as the baffles approach the aperture 25. The spring 19 also provides for the sealant action of the baffles against the wall of the container 10, thereby preventing the escape of the water to the rear of the baffles 14 and 15 which are driving the water to the aperture 25.

The decrease in the space of the annular passage 18 as the baffles approach the aperture 25 causes the tube of flow of the water to narrow in the passage 18, thus the velocity of flow of the water is substantially increased. The water in the passage which passes through the aperture 25 into the duct passage 31 is caused to move at a velocity greater than the velocity of the water in the passage 18 at the bottom of the drum 9. Therefore, the water flowing in the passage 31 (shown in larger cross-sectional dimension V than might be practiced in actual application in order to illustrate details) is caused to flow at a substantial velocity to the filter device 32.

As best seen in FIG. 4 the water flow, designated by the arrows, passes through the aperture 25 into and through the passage 31 to the filter device 32 wherein the water, at increased velocity of flow, is "hurled" at the perforated filter section 37 of device 32. The action of hurling the water at the filter section 37 provides for a more effective physical breakdown and separation of soils and lint from the water than is achieved with conventional washer and dryer centrifugal pumps and filters.

The filter section 37 can be made of a suitable layer or layers of tightly woven porous cloths stretched across a framework of the filter device. Since the water is caused to flow at the filter secetion 37 with a degree of substantial velocity, the type of filtering cloths or aids may be fairly tightly woven which will provide for the finest solid soil particles to be filtered from the wash water. The water which passes through the filter section 37 is then caused to flow through the filter section 47 because the solid section 42 of device 32 blocks the entrance of water into the passage 36.

The water that enters the top half of the filter device 32 flows through perforations in the section 47 to the bottom of the filter device and into the duct passage 34. From passage 34 the water, at this stage being filtered free of soils and lint, flows through the aperture 60 through the re-introduction duct hose 61 through the aperture 62 into the interior of the drum 9, wherein the regenerated washing water provides for a more efficient and effective washing of clothes.

When a washing operation is concluded the wash water is discharged from the machine as herein to be explained. A rinsing cycle within the washing operation, wherein the clothes are subjected to a rinse of clear water is not herein explained, since it is to be understood that the functions of the machine remain the same as just explained for a washing cycle. Instead of "detergent" water being used and discharged, the rinse water is used and discharged.

Referring now particularly to FIG. 6 the discharge of wash, or rinse, water from the drum and machine 1 is provided for by rotation of the filter device 32 in a counter-clockwise direction by means provided for by a solenoid. Rotatable movement of the device 32 is provided for by the section 42 passing through the slot 51 of the filter section 47, and by the section 44 passing upwardly through the slot 52 of the section 47. It is to be noted that the round rods 39 and 40 enable the stable rotation of the device 32 by means of the guide holes provided for in the section 47 and solenoid brace 54a.

In FIG. 6 the filter device 32 is shown in its rotated "discharge" position. The imperforate section 42 is now shown moved to the lower half of the passage 34 and the perforated section 44 is shown in the upper half of the passage 34. The perforated central section 37 is shown in a horizontal position resting adjacent on the section 47 of the device 32.

The effect of the section 37 being moved to rest adjacent to section 47 in the position shown in FIG. 6 is to accomplish a solid or imperforate cover plate which will not allow passage of water into the lower part of passage 34. A solid cover plate is achieved by the *perforations* P in the upper section of elements 37 (herein shown in horizontal position as the left side of device 32) being placed over the *imperforate* I portions of the section 47, and the *perforations* in the lower section of element 37 (shown horizontally as the right side) being placed over the *imperforate* portions of the section 47. The drawing of FIG. 6 illustrates the action, just explained, by showing impreforated portions I of the filter device 32 by cross-hatched lines and the perforations P are shown without cross-hatching.

With the filter device 32 in the position shown in FIG. 6, the water and/or air being propelled by the baffles 14 and 15 into and through the passage 31 passes through the perforations of filter section 44 into the duct passage 36. The water then passes through the aperture 55 into the drain hose 56 for discharge into a household sink.

The termination of the water discharge operation consists of the device 32 being rotated to the water re-introduction position seen in FIG. 4. The washing operation is then also concluded by the de-energization of the motor 77 and the other components in the machine. An automatic door lock is unlatched and the clothes can then be removed from the machine.

Referring now particularly to FIGS. 2, 4, and 5, a clothes drying operation is illustrated. A clothes drying operation is performed in the machine 1 by placing clothes in the drum 9 through door 4. When the door is closed the energization of motor 77 and the cooperating pulleys and sheaves rotate the drum and the vanes 22 to tumble the clothes in the drum.

The heater 64 in the enclosure 63 is energized thereby providing heat to dry the clothes. The filter device 32 is positioned as seen in FIG. 4 and the baffles 14 and 15 push lint-laden air through the annlar passage 18 through the aperture 25 into passage 31. The mechanics of the actions of the baffles 14 and 15, the annular passage 18, and other related mechanisms are very similar in performance as just previously described for the washing operation.

The air that is thrust into the passage 31 by the baffles 14 and 15 is directed to the filter device 32. The air passes through the vertically positioned top half of filter section 37 wherein the lint, and other soil residuals extracted from the clothes are collected. The moving air then passes through the horizontally positioned filter section 47, wherein more lint and residues are collected, and escapes through the aperture 60 via the passage 34. The moving air then flows in re-introduction hose 61 through the aperture 62 over the energized heater 64, which heats the air, entering the drum 9 to perform a drying function. Thus, a continuous movement, circulation, and agitation of hot air provided by means of the baffles 14 and 15, passage ducts 31, 34, hose 61, and the vanes 22 in the machine is achieved thereby eliminating the need for a conventional centrifugal blower in the machine 1. Further, the components and related mechanism, just cited, coupled with the action of the filter device 32 provides a means to more effectively collect lint and soil residues from a continuous flow of contaminated air throughout the entire drying operation.

The vent flap 65 provides a means to introduce ambient air, when required, into the drying drum as previously described, during a drying operation, and it also serves the purpose of providing an introduction means for ambient air to enter into the drum during an ambient air "fluff" dry cycle as will be briefly explained later herein below.

Referring now particularly to FIG. 6 the discharge of heated air from the machine at the end of a drying operation is explained. The drying operation is terminated by exhausting the heated moisture-laden air from the machine 1. In order to exhaust the heated moisture-laden air from the machine the filter device 32 is placed in a position as seen in FIG. 6 for the discharge of water during the washing operation. As the air being thrust from the annular passage 18 passes through the filter perforations of section 43 additional lint is collected therein, and thus no lint escapes to the discharge duct or venting system. Therefore, there will be no accumulation of lint in the hose 56 or the exhaust system of the machine 1 that occurs in conventional dryers and which creates a fire hazard. In addition, the centrifugal blower required in conventional dryers to exhaust the heated air from the dryer is eliminated in this invention.

A "fluff" cycle is provided during the drying operation, after the heated air has been exhausted from the machine. The vent flap 65 is placed in an open position, seen in FIG. 8, to enable ambient air to enter the drum 9 for an ambient air "fluff" cycle. The "fluff" cycle is comprised of introducing ambient air into the drum and tumbling the clothes while the tumbling clothes are exposed to circulating and agitated ambient air.

When the "fluff" cycle is concluded the motor 77 and the other components of the machine are de-energized and the clothes are withdrawn from the machine 1 through the opening provided by opening the door 4.

Referring now particularly to FIG. 12 and FIG. 2 there is shown one of two simple spring-loaded catch devices 94 and 95 located opposite one another on the two ends of the front edge of the walls 11 of drum 9. A spring retainer 96 presses the female catch member 94 against and in coupling fashion with a male catch counterpart 97. When the two parts 94 and 97 are engaged the catch device 94 assists in keeping the hingeably moveable top section 98 of drum 9, best seen in FIG. 1, firmly in place with the lower section of the drum 9 while the drum 9 is rotated. The opposite catch device 95 is identical in structure as device 94 and performs the same function as device 94. When the drum section 98 is to be lifted with the lid-door 4 to expose the interior of the drum 9 for the operator to load or unload clothes from the machine 1 the catches 94 and 95 are disengaged simply by the small lifting force exerted by the operator in lifting the lid-door 4. Conversely, the catches 94 and 95 are placed in an engaged condition when the operator closes the lid-door 4.

With the combination washer and dryer herein disclosed clothes can be washed and dried in one machine possessing more efficient and effective means to wash and dry the clothes, as well as providing a combination, or separate washer and dryer, units which will cost less to manufacture than existing washers and/or dryers.

Referring now particularly to FIG. 13 there is shown a control assembly 99 for the machine 1. The operation and cycles of the washer and dryer is sequenced by the control assembly 99. The description of the sequence control assembly 99 is briefly now herein to be described, but does not form any part of the present invention, and is set forth merely to provide a substantially complete description of an operative machine.

A synchronous motor 100, conductor band control card 101, and conventional switches, not shown, are conventionally formed as a unitary control assembly 99 located in the conventional manner in a back-splasher panel 5 which is positioned at the back and the top of the cabinet 2. A suitable control dial 3 is provided for the simultaneous manual rotation of the operation indicator 4 and the conductor band card 101 to advance a plurality of conductor bands 102 to a desired position for the initiation of the constant speed motor 100 to provide means for the operation of the various components of the machine.

When the operator has selected the desired cycle (such as seen in FIG. 22; the electric schematic diagram of the machine) to be performed, the conductor band card 101 is in position to start the operation.

Referring now particularly to FIG. 15 the conductor band card 101 is formed of three principal parts, a rear plate portion 103, a plurality of conductor bands 102, and the front plate portion 104. The rear plate 103 and the front plate 104 are made of a suitable non-conducting material such as Bakelite to which the conductor bands 102 are secured by suitable means such as bolts or screws. The plurality of conductor bands 102 are made of suitable current conducting material such as copper or steel. Each single conductor band of the plurality of bands 102 is formed as a single strip of metal shaped in a circular manner to coincide with the circular shape of the rear and front plates and to fit between the plates 103 and 104. Each single conductor band has a plurality, or series, of band protrusions or projections, such as, for example, band projections 105 and 106 as seen in FIG. 16, formed from the single strip of conducting material that constitutes a single conductor band.

The series projections are of different and predetermined lengths and provide the means, when placed in contact with a main energizing conductor bus bar 107 to energize the various components of the machine for predetermined periods of time.

The front cover is also made of non-conducting material and is placed over the conductor bands 102 and secured to the rear plate 103 by suitable means such as screws or bolts. The front plate 104 has a plurality of apertures, for example, the representative aperture 108, which coincide in size and shape with the projections 105 and 106 and fit snugly over the entire series of projections such as represented by projections 105 and 106. For every projection of the conductor bands 102 there is a corresponding aperture 105.

With the representative conductor bands 102 secured between the front plate 104 and the rear plate 103 the only surface areas of the conductor bands exposed to make contact with the main energizing conductor bar 107 are the surface areas of the band protruding through apertures, such as those represented by the aperture 108. The band projections are provided in order to make electrical contact with the bus conductor bar 107 when the conductor band card 100 is rotated by the energization of motor 100.

When the energized main bus bar makes electrical contact with the conductor band projections a single component of the machine electrically connected to a single conductor band is energized. When the main conductor bus bar does not make electrical contact with the conductor band, because there will be no surface area of the band projection exposed for contact with the main conductor bar (as provided for by the structure of the non-conductive front plate and conductor band design) the component electrically connected to the band will not be energized.

The control assembly 99 functions, as now briefly explained, in the following manner. The conventional pushbutton 8 is depressed and energy is transmitted simultaneously to the main conductor bus bar 107 and the constant speed motor 100. The motor 100 causes the conductor band card 101 to rotate, herein shown as rotating counter-clockwise and the various band projections of the conductor bands traverse over and in physical and electrical contact with the energized bus bar 107. The bus bar 107 then transmits electric current through the conductor bands and then through conducting wires, for example representative wires 109 and 110, which lead to individual components within the machine. It is to be understood that generally for each component in the machine there is a specific conductor band (possessing a series of specific conductor band projections of predetermined length) to energize or de-energize the component. In the manner just described the main conductor bus bar and conductor bands carry electric current to their respective components in a sequential manner to perform the operations within the machine. At the end of a washing or drying operation the energized bus bar energizes a main switch which cuts off the main electric current to the machine 1 and the machine is ready to perform another operation. The manner in which the energized bus bar cuts off the main electric current to the machine 1 will be explained in the following explanation of the schematic diagram of FIG. 24.

Referring now particularly to FIGS. 14 and 15 there is shown the sequence control card 101, and the specific conductor bands which cause the operation of the machine 1. As the card is rotated counter-clockwise by the motor 100 bands 143 to 150 are energized via their exposed surface areas (or band projections 102) to energize their related components, 100, 71, 74, 77, 146b, 147b, 64, 149b, and 151 (seen in FIG. 24).

The cross-hatched areas represent the exposed surface areas of the conductor bands which make electrical contact with the conductor bus bar 107. The band surfaces covered by the non-conducting material of the front plate 104 are the non-conducting portions of the bands and "no contact," N.C., between the bus bar 107 and the bands is made.

The solid shaft 3a of the motor 100 extends through suitable holes in the control card support 109a, the control card 101, and the wall of the assembly enclosure 5 to the selector knob 3 where the motor shaft 3a is rigidly fixed to the knob 3. The shaft is moveable in all the foregoing holes, just cited, except that hole in the control card 101. The control card 101 is rigidly attached to the shaft at the hole provided for in the control card. This control card attachment to the shaft provides means to rotate the card manually by movement of the knob 3, or the energization of the motor 100.

The operator selects an operation to be performed in the machine by rotating the knob 3. Attached to the shaft 3a is an indicator card 4 which indicates the operation to be performed through an aperture in the front wall of the assembly enclosure 5. When the printed sign for the operation is viewable through the aperture, the conductor bands related to the desired operation will be placed in contact with the bus bar 107. A dial stop mechanism 111 precisely locates the card 101 in position for an operation. The dial stop 111 is described in detail herein later in the text via the FIGS. 17 and 18 which illustrate the dial stop.

A trip switch mechanism, seen in FIGS. 22 and 23, and described herein later provide means to energize the bus bar 107 through the operation of the pushbutton 8.

Referring now particularly to FIGS. 17 and 18 there is shown a dial stop mechanism which provides means to precisely position the control card in a start position to perform the operations in the machine. The dial stop mechanism 111 is located on the bus bar 107. The dial stop 111 consists of a semi-spherical and portion 112 which has a cylindrical rod portion 113 and an opposite disc-shaped end 14. The portions 112, 113, and 114 comprise a slideably moveable element of the dial stop 111.

Located in the front of the control card 101 is a semi-spherical cavity 115 into which the semi-spherical end 112 of the dial stop snugly fits. Located in the bus bar 107 is a cylindrically formed hole 116 which extends through the body of the bus bar. However, the hole 116 is not continuous in diametric dimension throughout the body of the bus bar 117. Generally in the middle of the bar 107 the hole 116 has a hole 117 smaller in diameter than the parent hole 116.

The end portion 112 and the rod portion 113 of the dial stop are inserted from the front of bus bar 107 into the holes 116 and 117. Prior to inserting the end portion 112 and the rod section 113 a spring 118 is placed around the rod section 113. With the spring 118 in place the portions 112 and 113 are inserted into the holes 116 and 117 and the disc-shaped end 114, possessing inner threads, is turned unto a threaded end of the rod 13. The dial stop 111 is thus assembled to function as a unitary control card dial stop mechanism.

As the control card 101 is rotated to a start position to perform an operation in the machine the semi-spherical end 112 of the dial stop slides along the planular surface of the card 101. As the semi-spherical cavity 115 on the card advances to the stationary semi-spherical end portion 112 the spring 118 pushes the end 112 into the cavity 115, seen in FIG. 18, and the rotation (caused by the operator) of the card is stopped.

The card 101 is then engaged with the dial stop 111 at the exact point at which an operation in the machine begins.

Referring to FIG. 17 the end 112 is not engaged with the dial stop 111 and the card 101 is free to rotate over the bus bar 107. It is to be understood that when the motor 100 is energized it possesses sufficient torque to cause the spring 118 to compress and therefore the end portion 112 slides out of the cavity 115, thereby enabling the motor caused rotation of the card 101 to provide for an operation.

Referring now particularly to FIGS. 20 and 21 there is shown the pushbutton mechanism 8. The mechanism of button 8 consists of a cylindrical rod portion 119 with a threaded end upon which the button 8, possessing a threaded cavity, is turned tightly upon the rod. The rod section 119 has a middle section 120 which has a larger diameter than the end section of the rod 119 which inserts into the button 8. At the opposite end of the rod 119 the rod has an end section 121 larger in diameter than the middle section 120. The end section 121 is cut at an angle as shown in the FIGS. 20 and 21.

Prior to placing the nut-like button 8 on the threaded end of the rod 119 a spring is placed over the middle section 120 of the rod between the end portion 121 and the cabinet wall 2. The rod 119 is then inserted through a hole 123 in the cabinet wall and then the button 8 is mounted on the rod 119. Thus the spring is contained between the wall 2 and the end 121 of the button structure.

Referring now particularly to FIG. 20 the pushbutton 8 is shown in a non-operating condition. A gravity switch 124 lies adjacent on the angular surface of the rod 19. When the button 8 is depressed the switch 124 is caused to move away from the rod 119 as seen by the arrow. The switch 124 in the position indicated by C then makes contact with a conductor (not shown) to energize the machine 1.

Referring now particularly to FIG. 21 the button 8 is shown in a depressed state and the switch 124 is in an electrical contact position C. The spring 122 is shown in an extended condition. When the operator releases pressure from the button 8 the spring compresses, as seen in FIG. 20, and the button 8 is in position to initiate another operation in the machine 1. The switch 124 is pushed back to an open position, as illustrated in FIG. 20, by the operation of a relay herein not shown and which will be explained in the text related to FIG. 24 of the schematic of the machine.

Referring now particularly to FIG. 19 there is shown a schematic diagram of a representative control card at a "start" position S and at a "finish" position F of an operation. The segment A outlined on the card 101 shows the exposed areas or projections 105 and 106 of the conductor bands 102 which conduct current through representative wire conductors 109, 110, and 110a to the components of the machine. As the card 101 is rotated counterclockwise in the direction of the arrow by the energized motor 100, not shown, the plurality of the bands 102 travel over the bus bar 107 and at the end of the operation the section A of the card will assume the "finished" operation position F.

Referring now particularly to FIGS. 22 and 23 there is shown a trip mechanism illustrating the manner in which the main circuit of the machine is de-energized. The trip mechanism consists of a switch retainer 125 which is fixed to the stationary support 109a of the assembly 99. Moveably inserted in a curved slot 126 in the retainer 125 is the switch 127. Located and fixed on the rear of the control card 101 is a cam-like tripper projection 128 which pushes the switch 127 away from electrical contact with the conductor 129 in the direction of the arrow O when the card 101 is rotated by the operator to a start position. When the operator turns the selector knob 3, indicator 4, and card 101 to a start position the tripper 128 trips open the switch 127 to provide means to energize the components in the machine. The detailed functioning of this trip mechanism will be explained in detail and more fully understood with the following explanation of the schematic diagram of FIG. 24.

The switch 127 when caused to be opened by the tripper 128 will assume the position P. With the switch 127 in the position P tripper 128 is free to move with the card 101 as the card is rotated by the motor during an operation.

Referring now to FIG. 24 there is shown the schematic circuit diagram of the machine 1. The diagram shows the control system for the machine 1 as it is controlled by the sequence control assembly herein disclosed. The entire control system of the machine 1 may be energized across a three wire power supply which includes supply conductors 130 and 131 and a neutral conductor 132. For domestic use, the conductors 130 and 131 will normally be connected across a 220 volt power supply with 110 volts appearing between the neutral line 132 and each of the conductors.

In the machine 1 there is provided the sequence control assembly 99, FIG. 13, which affords an integrated control circuit to perform operations in the machine. The cooperative electrical relationship of the assembly 99 with the various electrical components in the machine 1 will now be described. The sequence control card 101 is schematically shown as including a plurality of conductor bands 143 through 150 which are respectively positioned for electrical contact, during an operation, to appropriate terminals in contact with the conductor bands 143 through 150 of the control card 101. From the terminals in the support 109a a plurality of conducting wires 143a through 150a extend to each of the components of the machine 1. The moveable sequence control card 101 of disc-shape is rotatably advanced across the stationary conducting bus bar 107 in the manner previously described. The sequence control card 101 is rotatable as a unit by the energization of the small synchronous electric motor 100, in order that the bus bar may make contact, or not make contact, with the conducting bands of the control card. When bus bar 107 contact is made, as indicated by the cross-hatching, with any one conducting band a specific component which is electrically connected to the band will be energized. When the conducting bus bar does not engage any one conducting band as indicated by the "no contact" blank area, N.C. on the sequence control card 101, there is no energization of the band and no energization of the component electrically connected to the band. Thus, the bands making contact with the bus bar for predetermined lengths of time and also not making contact with the bus bar for predetermined time intervals, provide the means for the accurate sequential control of the various component during an operation within the machine 1.

The electrical system of the machine is energized by pushing or depressing "Start" button 8. It will be understood that in the conventional manner the manually operable start button 8 is positioned on the control panel housing 5 of the machine. When the switch 8 is depressed, the normally open switch 124 is caused to close on the contact of conductor 133. Thus, an energizing circuit across conductors, 130, 131 and 132 is completed. The energization of the solenoid 134 closes the switch 135 which operates a conventional door locking mechanism. The door locking mechanism is normally open when the circuit is de-energized, and when the circuit of machine 1 is energized for an operation the door locking mechanism is engaged. The lid-door 4 of machine 1 is thus locked during an operation as a safety feature. When the machine is in a non-operating condition the door lock is opened.

The switch 124 when closed also energizes the "start" conductor or terminal 136 through the conductor 137 which causes the main conductor bus bar 107 to be energized. However, the bus bar 107 will not be energized if it does make contact with the "start" terminal 136. If the operator does not turn the selector knob 3, and in turn rotate the sequence control card 101 to the proper "start" position the trip mechanism 139, illustrated in FIG. 22 and shown now only schematically, will not trip open the normally closed switch 127. Therefore the current from the conductor 137, which is conducted by the terminal 136 through the conductor 129 to the solenoid 138 will energize the solenoid 138. When the solenoid 138 is energized the switch 140 is caused to be closed on conductor 141. The current in conductor 141 is then carried to the relay 142 which when energized opens the closed switch 124. When the switch 124 is open the current from conductors 130 and 131 is cut off and the machine 1 is de-energized and will not operate.

When the control card 101 is placed in a proper "start" position to make contact with the terminal 136 the trip mechanism mechanically opens the normally closed switch 127 and no current is set to the solenoid 138. Therefore the solenoid 138 is not energized and the switch 140 remains open and no current is set to relay 142 and the switch 124 remains closed.

At the start of the operation current is trasmitted through the terminal 136 to energize the bus bar 107. The energized bus bar has immediate contact with the band 143. Energization of band 143 energizes the synchronous motor 100 through the conductor 143a. The energized motor 100 then causes the control card 101 to rotate counter-clockwise to traverse over the energized bus bar. It will be noted that the band 143 is in continuous electrical contact with the bus bar throughout the entire operation, as indicated by the cross-hatched lines on the band 143, in order to provide current to energize the motor 100 to rotate the card 101 throughout the entire operation. Thus, electrical contact between the energized bus bar 107 and the exposed areas of the conduct bands 143 to 150 will energize the various components of the machine 1. It is to be understood that the motor 100 will be immediately deenergized when solenoid 142 is energized to close switch 124, in the manner just described, if the terminal 136 and the bus bar 107 are not in proper "start" contact with one another.

The control card 101 is caused to move at a uniform rate of motion by the constant speed motor 100. Thus, the pre-determined length of the conductor bands of the control card, and the motion of the control card which is determined by the speed of the motor 100 will precisely control and define the period of each operation as provided for in the machine 1. For example, if the speed of the motor 100 causes the card to rotatably move one-half of an inch per minute, and the longest conducting band is 15 inches in length, the complete time for the operation (as determined by the longest conductor band and the constant rate of movement of the control card) will be 30 minutes.

The plurality of conductor bands 143 through 150 are shown electrically connected to the components they control under the heading "components" and perform the operation as follows:

With the switch 124 in a closed position and the conductor terminal 136 properly aligned with the main conductor bus bar 107 the machine is energized to perform a washing and drying operation.

As the control card 101 is caused to travel across the energized bus bar 101 by the band 143 and motor 100 the bus bar then makes contact with the band 144. When the band 144 is contacted it is energized and the band then conducts current through conductor 144a to the solenoid 71. Solenoid 71 provides for the introduction of hot water into the washing drum 9. As the hot water is introduced into the drum and reaches a predetermined level within the drum, the pressure activated sensing device or water level control 74 opens so as to de-energize the solenoid 71. Thus, when the proper level of water is reached for a washing operation the de-energized solenoid 71 terminates the introduction of water into the drum.

When the introduction of hot water is terminated, the bus bar makes contact with band 145. The band 145 energizes the motor 77 through conductor 145a to provide by way of the pulley and sheave assembly, a slow rotation of approximately 40 r.p.m. to the drum 9 for a washing operation. The drum rotates and causes agitation of detergent water and the tumbling of clothes in the detergent water which constitutes a washing operation.

At the end of the washing operation the bus bar engages band 146. The energization of band 146 energizes solenoid 146b which causes the filter device 32 to rotate counter-clockwise and assume a water discharge position (see in FIG. 6). The discharge position of the filter device 32 enables the soiled and detergent wash water in the drum 9 to be discharged from the machine 1 through the drain hose 56. It is to be noted that the bus bar continues to make contact with band 145 and keeps the motor 77 energized during the discharge period in order to rotate the drum and have the water propelled from the machine in the manner described earlier herein.

When all of the soiled detergent water is discharged from the machine, the bus bar again engages band 144 which energizes the solenoid 71 to provide for the introduction of clean rinse water for a rinsing cycle. The motor 77 continues to rotate the drum while clean rinse water is being introduced.

At the start of the rinse cycle the bus bar disengages band 146 which de-energizes the solenoid 146b and the filter 32 is rotated clockwise to a water re-introduction position (see in FIG. 4) thereby enabling the filter to clean the rinse water while the rinse water is being introduced into the drum.

When the drum is filled with clean rinse water the bus bar disengages the band 144 and de-energizes the solenoid 71, thus the bus bar and band 144 act as a safety shut-off or water fill termination means if the pressure sensitive device 74 should fail.

At the end of the rinse cycle the bus bar then engages the band 146 which energizes the solenoid 146b. Energized solenoid 146b then causes the filter 32 to be rotated counter-clockwise to a discharge position to enable the rotating drum and baffles 14 and 15 to discharge the soiled rinse water from the machine.

When all of the soiled rinse water is discharged the band 145 is disengaged from the bus bar. Disengagement of band 145 de-energizes the motor 77 and the slow rotation of the drum stops. Band 146 remains engaged with the bus bar to keep the solenoid 146b energized which keeps the filter 32 in a discharge position. At the end of the rinse cycle a centrifuging cycle is effected as now explained.

The centrifuging cycle commences with the engagement of the bus bar with band 147. The band 147 energizes through conductor 147a, the small cynchronous motor 147b which, via chain 88 and rigid member 89 pulls the sheave assembly 80 over to the right against the action of the spring 87 which in turn provides for the high speed rotation H.S.R. (several hundred r.p.m.) of motor 77.

The drum is rotated at several hundred revolutions per minute to extract residual water from the clothes. The residual water is then discharged through the filter 32 out of the machine through discharge hose 56.

After the centrifuging cycle the band 145 is disengaged and the motor 77 is de-energized thereby terminating the rotation of the drum. The band 147 is simultaneously disengaged with band 145. De-energization of band 147 de-energizes the motor 147b which adjusts the sheave assembly to provide a slow rotation (approx. 40 r.p.m.) of the drum when the motor 77 is to be energized again for another operation. The band 146 is also disengaged and the de-energization of the solenoid 146b is effected with the result that the filter device 32 is rotated clockwise to assume a water re-introduction position. Thus, the machine is emptied of water and the washing, rinsing, and centrifuging cycles in the overall washing operation are completed.

The control card continues to rotate because the band 143 is still energized by the bus bar and the energized bus bar continues to energize the various components of the machine for a clothes drying operation as now explained.

The clothes drying operation, shown as starting at point D on the card, is initiated at the end of the washing cycle with the bus bar engagement of band 148. Band 148 is engaged and energized in order to energize the heater 64 which provides means for the introduction of heat into the drum 9 for a clothes drying operation.

The clothes are tumbled in the drum by means of engagement of band 145 to energize the motor 77 for a slow rotation, and heat is force circulated in the drum. At the end of the drying cycle bands 145 and 148 are disengaged and the motor 77 and the heater 64 are de-energized.

With the motor 77 de-energized the band 147 is engaged to energize the small synchronous motor 147b which provides for the fast rotation of the drum when the band 145 and motor 77 are energized for a hot air exhaust cycle.

The hot air exhaust cycle commences with the band 145 being engaged directly after the band 147 is engaged. Thus the motor 77 is energized for high speed revolutions to discharge the heated air from the machine by means provided for by the baffles 14 and 15 and the exhaust passage of the machine. At the same time as the band 147 is engaged and motor 147b is energized the band 146 is also engaged. Band 146 energizes the solenoid 146b which provides means to rotate the filter device 32 in a counter-clockwise direction thus providing for a discharge position of the filter device and for clear passage of the hot air being expelled from the machine.

When all of the heated air is exhausted from the machine the band 145 is disengaged thus de-energizing the motor 77. The band 146 is disengaged thus de-energizing the solenoid 146b which causes the filter device to rotate clockwise to provide an air re-introduction position. The band 147 is disengaged thus de-energizing the motor 147b which places the motor 77 in a condition for slow rotation when the motor 77 is energized for a following "fluff" cycle no herein described.

The "fluff" cycle consists of tumbling the clothes in the drum while the clothes are being subjected to an introduction of ambient air. The fluff cycle starts with the engagement of band 145 which energizes the motor 77 for a slow rotation of the drum 9 and the tumbling of the clothes.

The band 149 is engaged at the same time as the energization of motor 77. The energization of band 149 causes current to be sent over conductor 149a to the solenoid 149b. The energization of solenoid 149b causes the vent flap 65 of the reintroduction duct hose 61 to be placed in an open, ambient air intake position, as seen in FIG. 8. As the drum rotates ambient air enter the ambient air inlet in the duct hose 61 and the air is introduced into the drum for a fluff cycle. The fluff cycle constitutes a means to raise the nap of the fabric of the clothes and to make the cleansed clothes feel softer.

The termination of the fluff cycle occurs with the disengagement of band 149 and the closing of the vent flap 65. The band 145 is disengaged and the motor 77 is de-energized which terminates the rotation of the drum.

The end of the fluff cycle is the last of the cycles provided for in the washing, rinsing, drying and fluffing operations of the machine 1.

However, the end of the overall operation, as just described, does not signal the termination of the movement of the control card 101 and the energization of the bus bar 107. The control card 101 continues to be rotated by the energized motor 100 through the band 143 and the band 150 is engaged at the end of the operation by the energized bus bar. The energized band 150 then energizes the solenoid relay 151 over the conductor 150a. The energization of relay 150 closes the switch 127 on the conductor 129. Current is then transmitted to solenoid 138 and the solenoid 138 is then energized to close switch 140 on conductor 141. When switch 140 is closed it enables solenoid 142 to be energized and the solenoid 142 then opens the closed switch 124. With the disconnection of the switch 124 the electric current provided for by conductors 130 and 131 for energizing the components of the machine is terminated.

It should be noted that the switch 127 is now in a closed position and the switch 140 is also in a tion and places the machine 1 in a ready to operate condition. When the switch 124 is open and the current from conductors 130 and 131 is disconnected, the solenoid 138 is, of course, de-energized. Thu the normally open switch 140 resumes its normally open condition. The conventional door lock, not shown, is also placed in an unlatched and the door 4 may be opened for the removal of the clothes.

While in accordance with the patent statutes I have described what at present are considered to be the preferred embodiments of my invention, it will be obvious to those skilled in the art that various changes and modifications may be made therein without departing from the invention, and it is therefore aimed in the appended claims to cover all such equivalent variations as fall within the true spirit and scope of my invention.

What I claim as new and desire to secure by Letters Patent of the United States is:

1. A combination clothes washer and dryer comprising,
    (a) a rotatably mounted, cylindrical drum carrying internal vane members for providing a clothes-tumbling action, said drum having sets of angularly-spaced perforations formed in the wall thereof,
    (b) means for rotating the drum about its axis in a given direction,
    (c) a stationary, cylindrical container inclosing the drum,
    (d) means mounting the container in eccentric relationship to the drum such that a cylindrical portion of the drum is in sliding adjacent engagement with a corresponding cylindrical portion of the container thereby forming an annular passageway of varying cross-section between the drum and the container.

(e) means forming an aperture in the annular wall of the container and extending substantially the axial length thereof, said aperture having an angular length substantially equal to that of the imperforated wall area of the drum, said imperforated wall area of the drum lying between the internal vane members and the angularly-spaced perforations formed in the wall of the drum.

(f) means forming a continuation of said annular passageway and constituting a re-circulation passageway between the interior of the drum and that portion of said annular passageway which is disposed proximate to and forwardly of the sliding adjacent engagement portions of the drum and container when said engagement portions are taken with reference to the direction of rotation of the drum, and (g) spring-biased baffle members carried by the drum and having planar extension ends extending into sliding engagement with the inner surfaces of the container, each baffle member being positioned proximate to and forwardly of one of the said sets of angularly-spaced perforations, when taken with reference to the direction of rotation of the drum.

(h) means forming an access door for loading of the drum.

2. The invention as recited in claim 1, wherein each of the said sets of perforations extend substantially along the full axial length of the drum, and wherein the planar extension ends of the baffle members have a length corresponding to the axial length of the container.

3. The invention as recited in claim 1, wherein the drum and the container are horizontally disposed, wherein the axial length of the drum is generally equal to the axial length of the container, and wherein the vertical wall portions of the container comprise a vertical wall enclosure of the drum.

4. The invention as recited in claim 1, including a moveably mounted filter and an electrical heater element disposed in the said re-circulation passageway, said heater being positioned between the filter and that end of the re-circulation passageway which is in communication with the interior of the drum.

5. The invention as recited in claim 1, wherein the re-circulation passageway comprises a generally-rectangular duct external of the container, said duct (having) one portion thereof in communication with the aperture in the container and another portion in communication with the interior of the drum through a flexible hose.

6. The invention as recited in claim 5 wherein the duct includes means forming filter and discharge compartments in the said duct and including a filter apparatus removably disposed in the said filter compartment.

7. The invention is recited in claim 6, wherein said filter apparatus has a perforate wall section joined to an imperforate wall section, and wherein the perforate wall section carries filter means, said imperforate and perforate wall sections being disposed above a longitudinal dividing line of said duct, wherein said filter apparatus also has a straight section and a radially curved section disposed below the said longitudinal dividing line, and wherein said straight and radially curved sections are perforate and carry filter means.

8. The invention as recited in claim 1, wherein the said re-circulation passageway comprises a generally rectangular duct having one end in communication with an ejection aperture, and a flexible hose connected to said ejection aperture, and wherein said hose is in communication with a hose-coupling member open to an injection aperture exposed to the interior of the drum.

9. The invention as recited in claim 8, including a filter device removably disposed within the duct, and an electrical heater element disposed in the said hose-coupling member.

10. The invention as recited in claim 1, wherein the said re-circulation passageway includes an ejection opening formed in the wall of the container, a generally-rectangular duct having a width substantially equal to the axial length of the container, one end of said duct being in communication with the said ejection opening and another end terminating in a cylindrical discharge compartment, and wherein a flexible hose is connected to the ejection opening and one end of the said compartment and the other end in communication with the interior of the drum, and wherein a second flexible discharge hose is connected to the said cylindrical discharge compartment in communication with a drain, said drain being exterior of the drum.

11. The invention as recited in claim 10, including gating means disposed within the said compartment, filter means carried by the gating means, a flexible hose and a discharge hose both having ends open to said compartment, and means mounting said gating means for rotation of said filter means between a first position blocking the flow of fluid and air to the said discharge hose and a second position blocking the flow of fluid and air to the said flexible hose.

12. The invention as recited in claim 1, wherein each baffle member comprises an elongated member having a length substantially equal to the axial length of the container and slideable in a longitudinal slot formed in the annular wall of the drum, spaced tubular members secured to the drum, a rod disposed within each tubular member, wherein said rod has an end secured to the said elongated member, and a coiled spring carried by each of the said rods; and wherein each of the said internal vane members comprises a housing inclosing the said tubular members and springs.

13. A combination clothes washer and dryer comprising, (a) a rotably mounted, cylindrical drum open at each end and carrying internal vane members for providing a clothes-tumbling action, said drum having sets of angulary-spaced perforations formed in the wall thereof, (b) means mounting the drums for rotation about its axis in a given direction, (c) a stationary, cylindrical container encircling the drum and having end walls normally closing the open ends of said drum and container, (d) means mounting the container in eccentric relationship to the drum such that a cylindrical portion of the drum is in sliding adjacent engagement with a corresponding cylindrical portion of the container hereby forminig an annular passageway of varying cross-section between the drum and the container, (e) means forming an access door for loading of the drum, (f) a rectangular duct exterior of the drum, said duct having side walls common to the said end walls, one end portion of said duct being in communication with an opening formed in the annular wall of said container forwardly of the engaged portions of the drum and container, (g) means forming an ejection aperture and a discharge aperture in a common wall of the duct and the container, said ejection aperture being positioned between said discharge aperture and the said opening in the annular wall of the container, (h) a flexible hose connected to the ejection aperture and in communication with the interior of the drum, (i) means forming a compartment in the said duct, (j) a gating means and filter device spanning the compartment forward in the duct, and (k) spring-biased baffle members carried by the drum and in sliding engagement with the interior surfaces of the container, each baffle member being positioned proximate to and forwardly of one of the said sets of perforation when taken with reference to the direction of rotation of the drum.

14. The invention as recited in claim 13, wherein each of the said baffle members comprises an elongated end member having a length substantially equal to the axial length of the compartment and slideable in a longitudinal slot formed in the wall of the drum; internal support members carried by the drum; rods connected to the said end member and extending into the said support members; and a compressed spring encircling each rod.

15. The invention as recited in claim 13, wherein the support members of the baffle members are inclosed within housings, which housings constitute the said internal vane members.

16. The invention as recited in claim 13, including an electrical heater element disposed in said hose, and wherein the said gating means and filter device are operable between a first position blocking the flow of fluid to the said discharge aperture and a second position blocking flows of fluid to the said ejection aperture.

17. The invention as recited in claim 15, including a vent flap pivotally secured to the said flexible hose, means forming an aperture in communication with the vent flap, and an air-flow constriction means disposed within said hose, the said aperture and flap being positioned between the air-flow constriction means and the interior of the drum.

References Cited
UNITED STATES PATENTS 3,410,118   11/1968   Dickey _____ 68—139 X WILLIAM I. PRICE, Primary Examiner U.S. Cl. X.R.

68—12, 19.2, 139